United States Patent
Dyer et al.

(10) Patent No.: US 9,949,529 B2
(45) Date of Patent: Apr. 24, 2018

(54) ARTICLE OF FOOTWEAR WITH SOLE STRUCTURE HAVING FRUSTO-CONICAL STRUCTURES

(71) Applicant: NIKE, Inc., Beaverton, OR (US)

(72) Inventors: Caleb W. Dyer, Beaverton, OR (US); Denis Schiller, Vancouver, WA (US); Timothy J. Smith, Portland, OR (US); Ruzica Krstic, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/087,330

(22) Filed: Mar. 31, 2016

(65) Prior Publication Data
US 2016/0295959 A1 Oct. 13, 2016

Related U.S. Application Data

(60) Provisional application No. 62/144,696, filed on Apr. 8, 2015.

(51) Int. Cl.
| | |
|---|---|
| *A43B 13/14* | (2006.01) |
| *A43B 13/22* | (2006.01) |
| *A43B 5/02* | (2006.01) |
| *A43B 13/02* | (2006.01) |
| *A43B 13/04* | (2006.01) |
| *A43B 13/18* | (2006.01) |
| *A43B 13/20* | (2006.01) |
| *B29D 35/12* | (2010.01) |
| *B29D 35/14* | (2010.01) |

(52) U.S. Cl.
CPC .............. *A43B 13/223* (2013.01); *A43B 5/02* (2013.01); *A43B 13/02* (2013.01); *A43B 13/04* (2013.01); *A43B 13/14* (2013.01); *A43B 13/184* (2013.01); *A43B 13/206* (2013.01); *B29D 35/122* (2013.01); *B29D 35/142* (2013.01)

(58) Field of Classification Search
CPC ....... A43B 13/184; A43B 13/02; A43B 13/04; A43B 13/14
USPC ................................... 36/135, 103, 61, 30 R
See application file for complete search history.

(56) References Cited

U.S. PATENT DOCUMENTS

| | | | |
|---|---|---|---|
| 1,607,375 A * | 11/1926 | Whipple ............... | A43B 13/223 12/142 R |
| 2,958,963 A * | 11/1960 | Lougheed ................. | A43B 5/18 36/127 |
| 8,756,834 B1 * | 6/2014 | Halberstadt ............... | A43B 5/02 36/128 |
| 2003/0226280 A1 * | 12/2003 | Paratore .................... | A43B 7/12 36/4 |
| 2013/0019499 A1 * | 1/2013 | Hsu ....................... | A43B 17/023 36/44 |

\* cited by examiner

*Primary Examiner* — Ted Kavanaugh
(74) *Attorney, Agent, or Firm* — Honigman Miller Schwartz and Cohn LLP; Matthew H. Szalach; Jonathan P. O'Brien

(57) ABSTRACT

An article of footwear has a sole structure with frusto-conical structures. The sole structure includes a sole plate and outer sole assembly. The outer sole assembly is placed on the outer surface of the sole plate. The outer sole assembly provides frusto-conical structures that protrude towards the outer surface of the sole plate. The frusto-conical structures have recesses facing the ground surface.

14 Claims, 19 Drawing Sheets

ARTICLE OF FOOTWEAR WITH SOLE STRUCTURE HAVING FRUSTO-CONICAL STRUCTURES

CROSS REFERENCE TO RELATED APPLICATIONS

This application claims the benefit of U.S. Provisional Patent Application Ser. No. 62/144,696, filed Apr. 8, 2015, the entire contents of which are hereby incorporated by reference.

TECHNICAL FIELD

The present embodiments relate generally to articles of footwear, and in particular to articles of footwear with sole structures.

BACKGROUND

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole An article of footwear may be used on many alternative types of ground surfaces. An article of footwear having at least one ground surface traction element or stud may be used to provide better traction on certain types of ground surfaces. In each case, use of an article of footwear in some types of ground surfaces, e.g., mud or slush, may result in accumulation of compacted ground surface material on the lower surface of the article of footwear. Accumulation of ground surface material on the lower surface of an article of footwear may reduce traction of the article of footwear and/or adversely affect performance characteristics of the article of footwear and the user.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
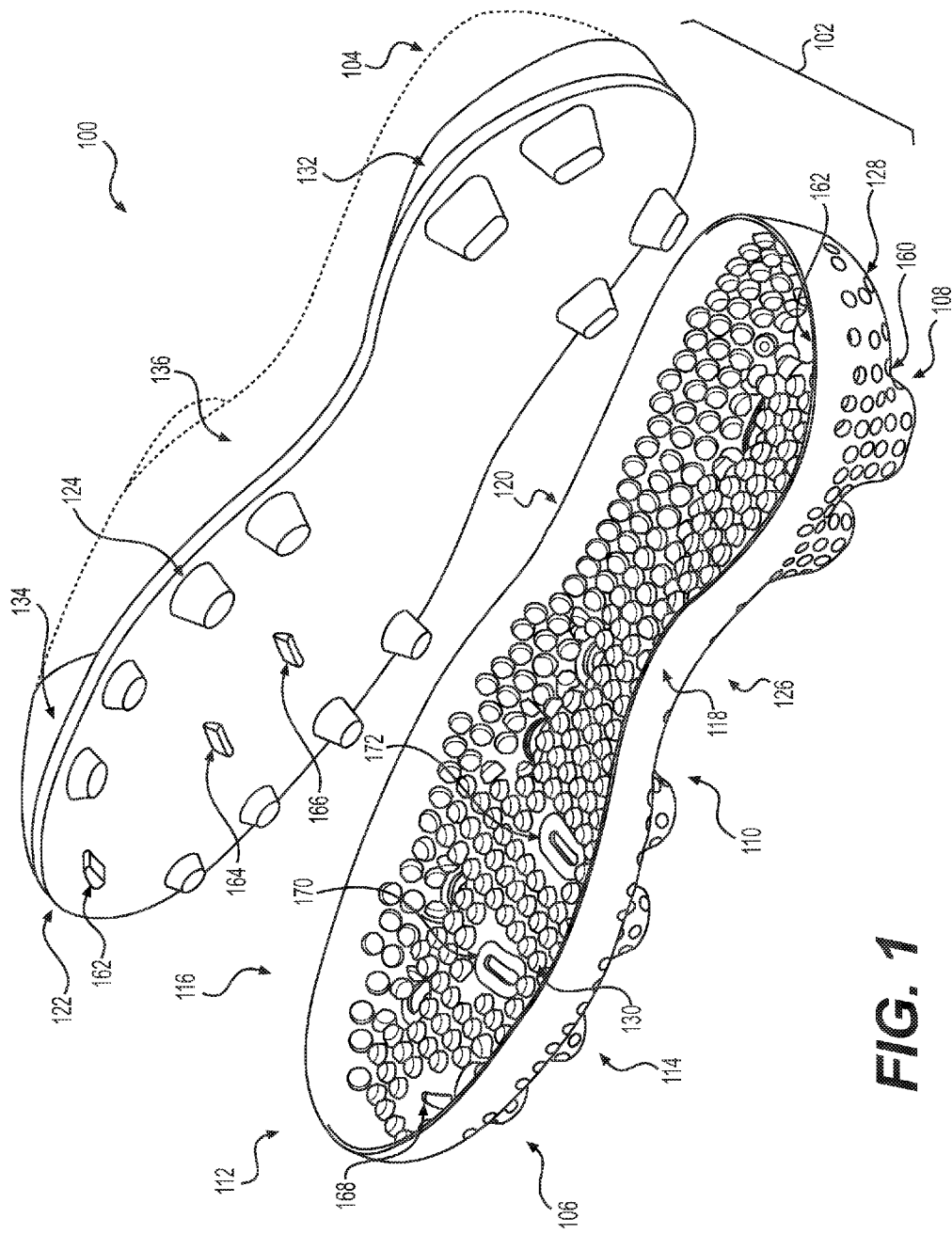
FIG. 1 is an exploded view of an embodiment of an article of footwear including an upper and a sole structure.

The present disclosure is directed to a sole structure for an article of footwear and a method of manufacturing a sole structure. In one embodiment, the sole structure comprises a first layer, the first layer including a first upper surface and a first lower surface and a second layer, the second layer including a second upper surface and an opposite exposed ground-contacting surface. The second upper surface may be located adjacent to the first lower surface of the first layer. The second layer may have at least one recess having a resilient frusto-conical structure extending from the exposed ground-contacting surface towards the first lower surface of the first layer. A closed end of the resilient frusto-conical surface may be exposed. The second upper surface may have a first protrusion corresponding to the closed end of the resilient frusto-conical surface.

The second upper can be formed of a multi-layer polymer material.

The exposed ground-contacting surface of the second upper surface can be formed of any suitable polymer material. In some embodiments, the polymer material may comprise a hydrophilic polymer material. The hydrophobic polymer material can comprise a polymer material capable of absorbing water. For example, the polymer material may have a maximum water absorbing capacity of at least about 10 percent by weight, based on the dry weight of the polymer material. The polymer material may have a maximum water absorbing capacity of from about 10 percent to about 1000 percent, based on the dry weight of the polymer material. In another example, the polymer material may have a maximum water absorbing capacity of at least about 50 percent by weight, based on the dry weight of the polymer material. The polymer material capable of absorbing water may comprise a hydrophilic thermoplastic polyurethane.

In some embodiments, a first stud may have a first side portion that may extend away from the first lower surface of the first layer and a second stud may have a second side portion that may be spaced away from the first stud extending away from the first lower surface of the first layer. The resilient frusto-conical structure may be located between the first and second studs.

In some embodiments, the second layer may include extended portions which may engage the first and second side portions of the first and second studs. The extended portions of the second layer may include at least a second recess having a second resilient frusto-conical structure extending from the exposed ground-contacting surface towards the first lower surface of the first layer. A closed end of the second resilient frusto-conical surface may be exposed. The second upper surface may have a second protrusion corresponding to the closed end of the second resilient frusto-conical surface.

In some embodiments, the second layer may include reference portions which may be constantly spaced from the first layer in any condition, wherein the space may be the height of the resilient frusto-conical structure.

In some embodiments, the second layer may have an interference fit with the first layer.

In some embodiments, a heel cup may include at least a third recess having a third resilient frusto-conical structure extending from the exposed ground-contacting surface towards the first lower surface of the first layer. A closed end of the third resilient frusto-conical surface may be exposed. The second upper surface may have a third protrusion corresponding to the closed end of the third resilient frusto-conical surface.

In some embodiments, the second layer may have a third layer, the third layer including a third upper surface and a third lower surface. The first lower surface may be adjacent to the third upper surface and the third lower surface is adjacent to the second upper surface. The third layer may have at least a fourth recess having a fourth resilient frusto-conical structure extending from the first lower surface towards the second upper surface. A closed end of the fourth resilient frusto-conical surface may be oriented toward the second upper surface. The third lower surface may have a fourth protrusion corresponding to the closed end of the fourth resilient frusto-conical surface. The first protrusion from the second upper surface may abut the fourth protrusion from the third lower surface forming a first double layer of resilient frusto-conical structures.

In some embodiments, the first upper surface of the sole structure may be attached to an upper of an article of footwear.

In some embodiments, when used in an article of footwear, the sole structure is effective to reduce adherence of debris to the exposed ground-contacting surface. For example, when an article of footwear having the sole structure is worn in a thirty (30) minute wear test on a wet grass field, a weight of the debris adhered to the second layer may be at least 15% less than a weight of debris adhered to an exterior surface of a control article of footwear, where the control article of footwear is identical to the article of footwear, where the control article of footwear is identical to the article of footwear except that the control article of footwear does not include the resilient frusto-conical structure. The weight of debris adsorbed to the article of footwear can be at least 20 percent less than the weight of debris adsorbed to the control article of footwear. The weight of debris adsorbed by the article of footwear can be at least 30 percent less than the weight of debris adsorbed to the control article of footwear.

The present disclosure is also directed to a method of manufacturing a sole structure by providing a first layer, the first layer including a first upper surface and a first lower surface, providing a second layer, the second layer including a second upper surface and an opposite exposed ground-contacting surface, forming in the second layer at least one recess having a resilient frusto-conical structure extending from the exposed ground-contacting surface towards the first lower surface of the first layer. A closed end of the resilient frusto-conical surface may be exposed, locating the second upper surface adjacent to the first lower surface of the first layer, and the second upper surface may have a first protrusion corresponding to the closed end of the resilient frusto-conic al surface.

In some embodiments, the method may further provide at least a first stud having a first side portion extending away from the first lower surface, provide a second stud having a second side portion spaced away from the first stud extending away from the first lower surface, and the resilient frusto-conical structure may be between the first and second studs.

In some embodiments, the second layer may further have extended portions of the second layer configured to engage the studs. The extended portions of the second layer may include at least a second recess having a second resilient frusto-conical structure extending from the exposed ground-contacting surface towards the first lower surface of the first layer. A closed end of the second resilient frusto-conical surface may be exposed. The second upper surface has a second protrusion corresponding to the closed end of the second resilient frusto-conical surface.

In some embodiments, the method may further provide a heel cup in the second layer having at least a third recess having a third resilient frusto-conical structure extending from the exposed ground-contacting surface towards the first lower surface of the first layer. A closed end of the third resilient frusto-conical surface may be exposed. The second upper surface may have a third protrusion corresponding to the closed end of the third resilient frusto-conical surface.

In some embodiments, the second layer may further have a third layer, the third layer including a third upper surface and a third lower surface. The first lower surface may be adjacent to the third upper surface and the third lower surface may be adjacent to the second upper surface. The third layer may have at least a fourth recess having a fourth resilient frusto-conical structure extending from the first lower surface towards the second upper surface. A closed end of the fourth resilient frusto-conical surface may be oriented toward the second upper surface. The third lower surface may have a fourth protrusion corresponding to the closed end of the fourth resilient frusto-conical surface. The first protrusion from the second upper surface may abut the fourth protrusion from the third lower surface forming a first double layer of resilient frusto-conic al structures.

In some embodiments, the second layer may include reference portions which may be constantly spaced from the first layer in any condition. The space may be the height of the resilient frusto-conic al structure.

In some embodiments, the second layer may reduce adherence of debris to the exposed ground-contacting surface by at least 15% less than a weight of debris adhered to an exterior surface of a control sole structure. The control sole structure may be identical to the sole structure except that the control sole structure may not include the second layer.

In some embodiments, following a thirty (30) minute wear test on a wet grass field, a weight of the debris adhered to the second layer may be at least 15% less than a weight of debris adhered to an exterior surface of a control sole structure. The control sole structure may be identical to the sole structure except that the control sole structure may not include the second layer.

In some embodiments, the method may further comprise providing an upper of an article of footwear; and attaching the upper to the first upper surface.

Other systems, methods, features, and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

Figure 2:
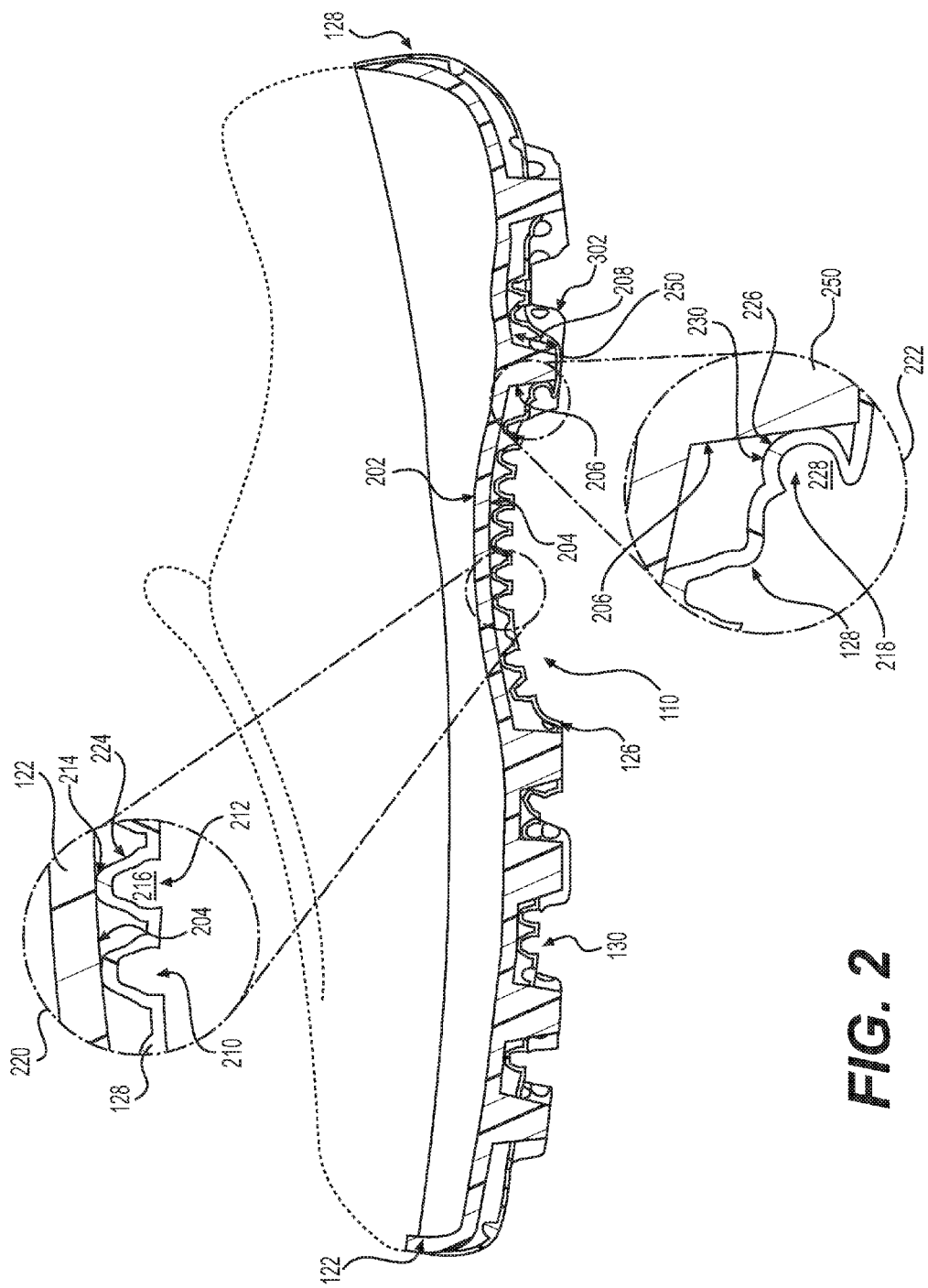
FIG. 2 is a side profile view of an embodiment of the sole structure of FIG. 1.
Figure 3:
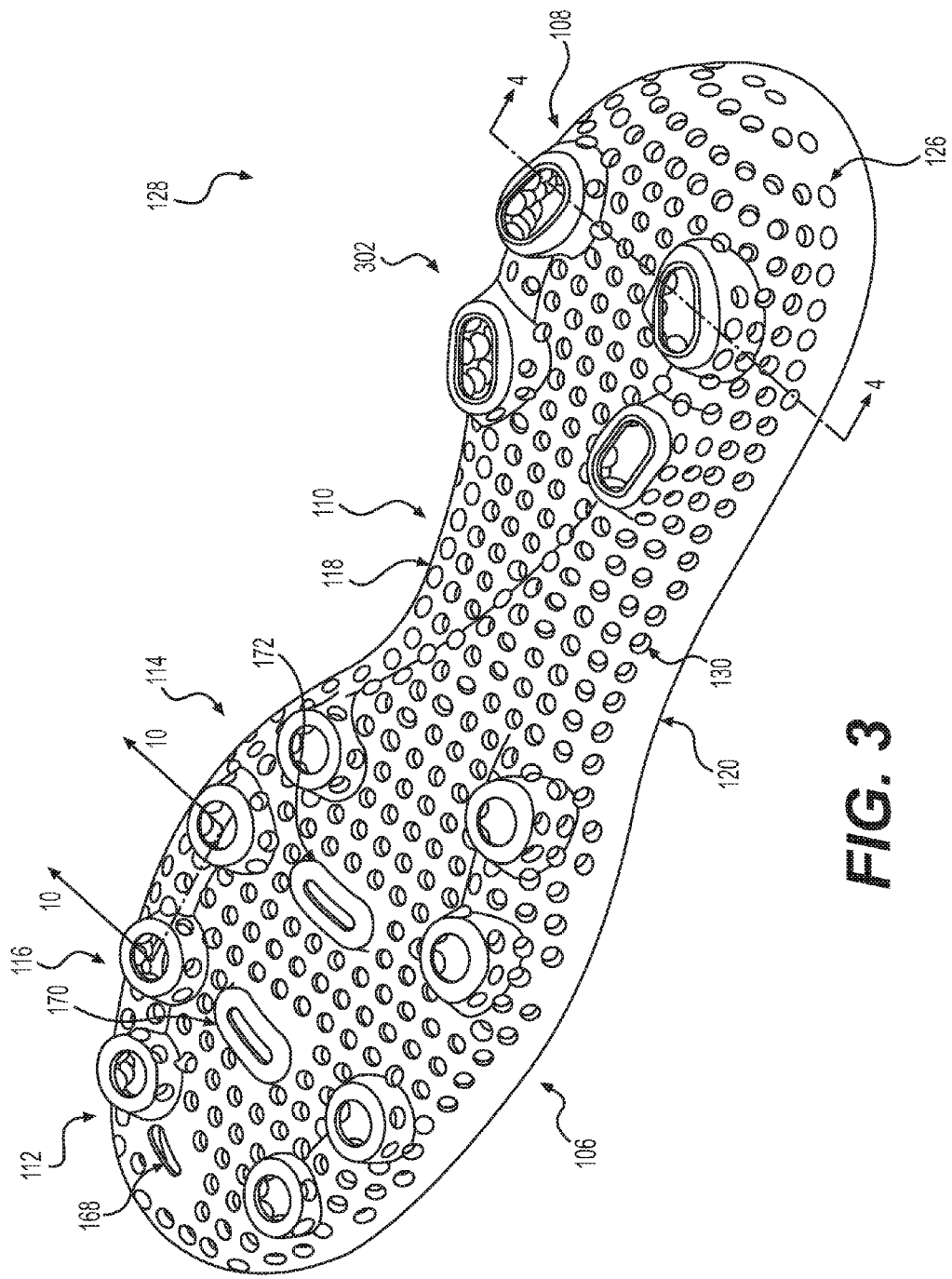
FIG. 3 is an isometric view of a lower surface of an embodiment of the outer sole assembly of FIG. 1.

FIGS. 1-3 illustrate various views of an article of footwear 100 including sole structure 102. Although the figures depict article of footwear 100 in the form of a specific type of article, the provisions discussed below for article of footwear 100 may be applied to any kind of article of footwear. In other embodiments, therefore, these provisions could be incorporated into various kinds of footwear including, but not limited to: soccer shoes, soccer cleats, soccer boots, cleats, football boots, baseball shoes, hiking boots, football shoes, sneakers, rugby shoes, basketball shoes, track shoes, snow shoes, firm ground shoes, as well as other kinds of shoes.

Article of footwear 100 may include an upper 104 as well as a sole structure 102. Generally, upper 104 may be any type of upper. In particular, upper 104 may have any design, shape, size, and/or color. Upper 104 may be any known or later developed upper structure or design. For example, in embodiments where article of footwear is a soccer shoe, upper 104 may be a low top upper with laces. In other embodiments, article of footwear may be a baseball shoe having a high top upper. A structure and design for the upper 104 may be selected that is suitable for a desired type of article 100 and intended use.

Sole structure 102 is secured to upper 104 and extends between the foot and the ground when article of footwear 100 is worn. Sole structure 102 may be any known or later developed sole structure and design suitable for a desired article of footwear 100. In different embodiments, sole structure 102 may include different components. For example, sole structure 102 may include an outsole, a midsole, insole, and/or a lasting board, made of known or later developed material(s) suitable for a desired use or activity. In some cases, one or more of these components may be optional.

In some embodiments, sole structure 102 may comprise an entirety of an outsole of article of footwear 100. In other embodiments, a sole structure may comprise a portion of an outsole of an article of footwear, including, but not limited to one or more of a forefoot region, a mid-foot region, and/or a heel region. In other embodiments, different configurations of a sole structure may be included in an article of footwear. For purposes of illustration, in various embodiments herein a sole structure is shown in isolation. In other embodiments, however, the sole structure could be associated with an upper for an article of footwear 100.

As shown in FIG. 1, article of footwear 100 may include a forefoot region 106, a heel region 108, and a mid-foot region 110. Forefoot region 106 may include a toe region 112 and a ball of foot region 114 disposed adjacent the toe region 112. Forefoot region may include a flex region 116 located between the toe region 112 and a ball of foot region 114 that facilitates flexion of the user's toes relative to the foot in active use of the article of footwear. Mid-foot region 110 may be located between the forefoot region 106 and the heel region 108, and may include a shank and/or arch region of the article of footwear. As used herein, the terms forefoot region 106, heel region 108, mid-foot region 110, toe region 112, ball of foot region 114, and flex region 116 are intended to refer to general areas or regions and not to particularly defined structures or boundaries.

Article of footwear 100 may include a medial portion and a lateral portion. Medial portion may include a medial side 118 of the article of footwear 100, including a medial edge. Lateral portion may include a lateral side 120 of the article of footwear 100, including a lateral edge. As used herein, the terms medial portion, medial side, lateral portion, and lateral side generally refer to relative portions of the article of footwear 100 and not to particularly defined structures or boundaries. Also, the terms medial and lateral may be used to describe relative portions of a particular structure of the article of footwear 100.

In some embodiments, sole structure 102 may be configured to provide traction for article of footwear 100. Sole structure 102 may be disposed as an outsole for an article of footwear 100 that includes a sole plate 122 having one or more ground surface traction elements or plurality of studs 124. Plurality of studs 124 may be included to provide additional traction against various types of ground surfaces, such as grass, mud, clay, sod, turf, dirt as well as other kinds of surfaces. Plurality of studs 124 may be of any design, shape, size, and/or color. In some embodiments, plurality of studs 124 may be bladed, hard-ground and/or round or conical. Plurality of studs 124 may be fixed, molded, or detachable on the bottom of the sole plate 122. Plurality of studs 124 may be plastic, rubber or metal-tipped. In the exemplary embodiment, plurality of studs 124 may further comprise a set of heel studs 132, a first set of forefoot studs 134 and a second set of forefoot studs 136. Set of heel studs 132 may comprise studs that are generally elongated and may facilitate traction in hard-ground environments. First set of forefoot studs 134 may include first middle stud 162, second middle stud 164, and third middle stud 166 having a rectangular shape. First set of forefoot studs 134 and second set of forefoot studs 136 may both have generally rounded shapes. As seen in FIG. 1, first set of forefoot studs 134 may be shorter than second set of forefoot studs 136. Also, second set of forefoot studs 136 may be shorter than set of heel studs 132. In the exemplary embodiment of FIG. 1, each set of studs includes four studs. In other embodiments, however, each set could be configured with any other number of studs. Structure, design, material(s), and construction for the plurality of studs 124 may be selected, including a number and configuration of plurality of studs 124 that is suitable for a desired type of article of footwear 100 and intended use.

As shown in FIG. 1, embodiments of a sole structure 102 may include provisions to prevent the accumulation of material or debris on a ground contacting surface 126 of the sole structure 102. In an exemplary embodiment, these provisions may include an outer sole assembly 128 having an outer sole assembly outer portion 160 and an outer sole assembly inner portion 162. In some embodiments, outer sole assembly 128 may have a plurality of frusto-conical structures 130 protruding away from the ground contacting surface 126. The plurality of frusto-conical structures 130 extend towards the sole plate 122. The plurality of frusto-conical structures 130 have recesses that are on the outer sole assembly outer portion 160. The plurality of frusto-conical structures 130 may have a resilient characteristic to prevent ground surface material from accumulating on the ground contacting surface 126.

Although the exemplary embodiment provides structures with frusto-conical geometries, in some other embodiments an outer sole assembly could include structures with different geometries of varying sizes and shapes. Such structures could have circular, oval, irregular, cylindrical, polygonal, rectangular, conical, elliptical, symmetrical, non-symmetrical, tear drop, geometric, non-geometric, coned-disc shaped, or cupped spring shaped as well as other kinds of shapes. In an exemplary embodiment, frusto-conical structures may be coned-disc shaped with varying sizes. A design and configuration of outer sole assembly 128 may be selected that is suitable for a desired configuration of an article of footwear 100 and its intended use.

FIG. 2 is a side profile view of article of footwear 100 including a sole plate 122 and outer sole assembly 128. As shown in FIG. 2, outer sole assembly 128 may be placed on an outer sole plate surface 204 of the sole plate 122. Outer sole assembly 128 may include one or more frusto-conical structures 130 of varying height. Frusto-conical structures 130 could have varying heights that are approximately 10% to 30% of the stud height 208, as discussed in further detail below.

The top insert 220 is an enlarged view of the sole structure 102 on the mid-foot region 110 of the article of footwear. First frusto-conical structure 210 and second frusto-conical structure 212 could be adjacent to outer sole plate surface 204. As used herein, the term adjacent generally refers to structures or elements that are next to or adjoining other structures or elements and may include intervening structures or elements. Second frusto-conical structure 212 includes load portion 214, spring portion 224, and recess portion 216. The load portion 214 of the frusto-conical structure could be adjacent to the outer sole plate surface 204. The spring portion 224 extends from the load portion 214. The recess portion 216 may be on the ground contacting surface 126 of the outer sole assembly 128.

The bottom insert 222 is an enlarged view of the sole structure 102 located next to a stud 250 of sole plate 122. Stud 250 may have a side stud portion 206. Third frusto-conical structure 218 may be adjacent to side stud portion 206. Third frusto-conical structure 218 includes load portion 226, spring portion 230, and recess portion 228. The load portion 226 of the third frusto-conical structure 218 may be adjacent to the side stud portion 206. The spring portion 230 extends from the load portion 226. The recess portion 228 of third frusto-conical structure 218 may be on the ground contacting surface 126 of the outer sole assembly 128.

FIG. 3 is an isometric view of the ground contacting surface 126 of the outer sole assembly 128. As shown in FIG. 3, in some embodiments, an outer sole assembly 128 may include multiple frusto-conical structures 130. In some embodiments, one or more frusto-conical structures may be concentrated in the forefoot region 106. In other embodiments, one or more frusto-conical structures may be situated in the mid-foot region 110. Also, there could be one or more frusto-conical structures in the heel region 108. In the exemplary embodiment, a plurality of frusto-conical structures 130 are located throughout the outsole.

The outer sole assembly 128 may have extended portions 302 that extend from the ground contacting surface 126 of the outer sole assembly 128. As shown in FIG. 2, extended portions 302 may have an interference fit with the plurality of studs 124 of sole plate 122. In some embodiments, one or more frusto-conical structures 130 may be located on the extended portions 302. In the exemplary embodiment, some of the plurality of frusto-conical structures 130 are located between the extended portions 302 and some of the plurality of frusto-conical structures 130 are located on the extended portions 302. A design and configuration of multiple frusto-conical structures 130 may be selected that is suitable for a desired configuration of an article of footwear 100 and its intended use.

As shown in FIG. 3, first middle gap 168, second middle gap 170, and third middle gap 172 are included in the outer sole assembly 128 to receive the first middle stud 162, second middle stud 164, and third middle stud 166, respectively. The gaps and studs are aligned for an interference fit to ensure a tight fit so that the outer sole assembly 128 is secured to the sole plate 122.

Figure 4:
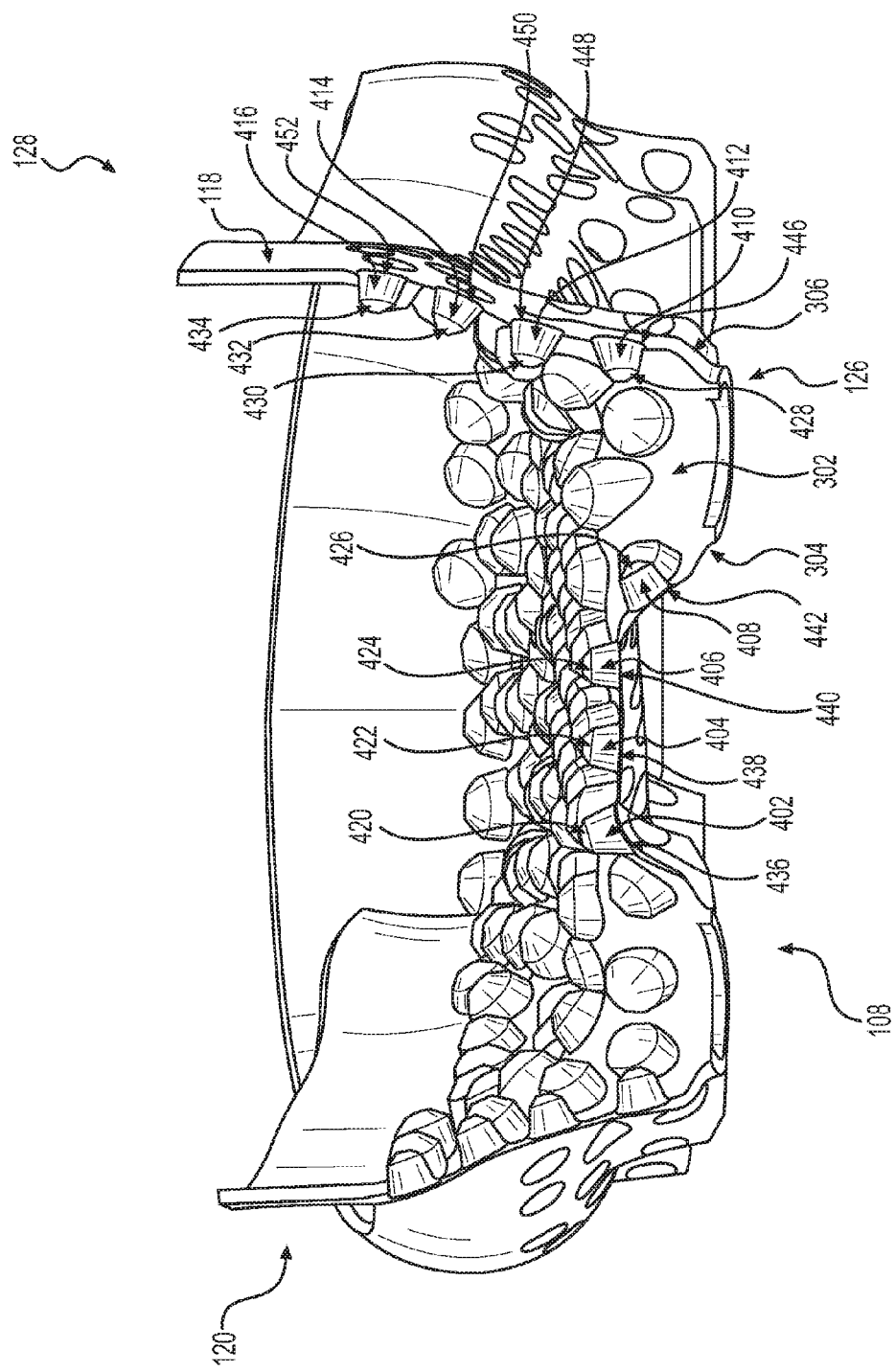
FIG. 4 is a cross-section view of an embodiment of the outer sole assembly of FIG. 3 taken along line 4-4.

FIG. 4 is a cross-section view of the outer sole assembly 128 taken along 4-4 of FIG. 3. In some embodiments, one or more frusto-conical structures may be located throughout the outsole of the outer sole assembly 128. As shown in FIG. 4, in the exemplary embodiment, first frusto-conical structure 402, second frusto-conical structure 404, and third frusto-conical structure 406 may be located on the heel region 108 of the outer sole assembly 128. The first recess portion 436, the second recess portion 438, and the third recess portion 440 of the frusto-conical structures may face the ground contacting surface 126. The first load portion 420, the second load portion 422, and the third load portion 424 of the frusto-conical structures may extend away from the ground contacting surface 126.

In some embodiments, one or more frusto-conical structures may be located on the extended portion 302 of the outer sole assembly 128. The extended portion 302 may have first side portion 304 and second side portion 306. Also, shown in FIG. 4, in the exemplary embodiment, fourth frusto-conical structure 408, fifth frusto-conical structure 410, and sixth frusto-conical structure 412 may be located on the extended portion 302. The fourth frusto-conical structure 408 may be located on the first side portion 304 of the extended portion 302. The fourth recess portion 442 of the fourth frusto-conical structure 408 may be facing the first side portion 304. The fourth load portion 426 of the fourth frusto-conical structure 408 may be extending away from the first side portion 304. The fifth frusto-conical structure 410 and sixth frusto-conical structure 412 may be located on the second side portion 306 of the extended portion 302. The fifth recess portion 446 of the fifth frusto-conical structure 410 and the sixth recess portion 448 of the sixth frusto-conical structure 412 may be facing the second side portion 306. The fifth load portion 428 of the fifth frusto-conical structure 410 and the sixth load portion 430 of the sixth frusto-conical structure 412 may be extending away from the second side portion 306.

In some embodiments, one or more frusto-conical structures may be located on the lateral side 120 or medial side 118 of the outer sole assembly 128. As shown in FIG. 4, in the exemplary embodiment, seventh frusto-conical structure 414 and eighth frusto-conical structure 416 may be located on the medial side 118 of the outer sole assembly 128. The seventh recess portion 450 of the seventh frusto-conical structure 414 and the eighth recess portion 452 of the eighth frusto-conical structure 416 may be facing the medial side 118 of the outer sole assembly 128. The seventh load portion 432 of the seventh frusto-conical structure 414 and the eighth load portion 434 of the eighth frusto-conical structure 416 may be extending away from the medial side 118 of the outer sole assembly 128. A design and configuration of multiple frusto-conical structures may be selected that is suitable for a desired configuration of an article of footwear 100 and its intended use.

Figure 5:
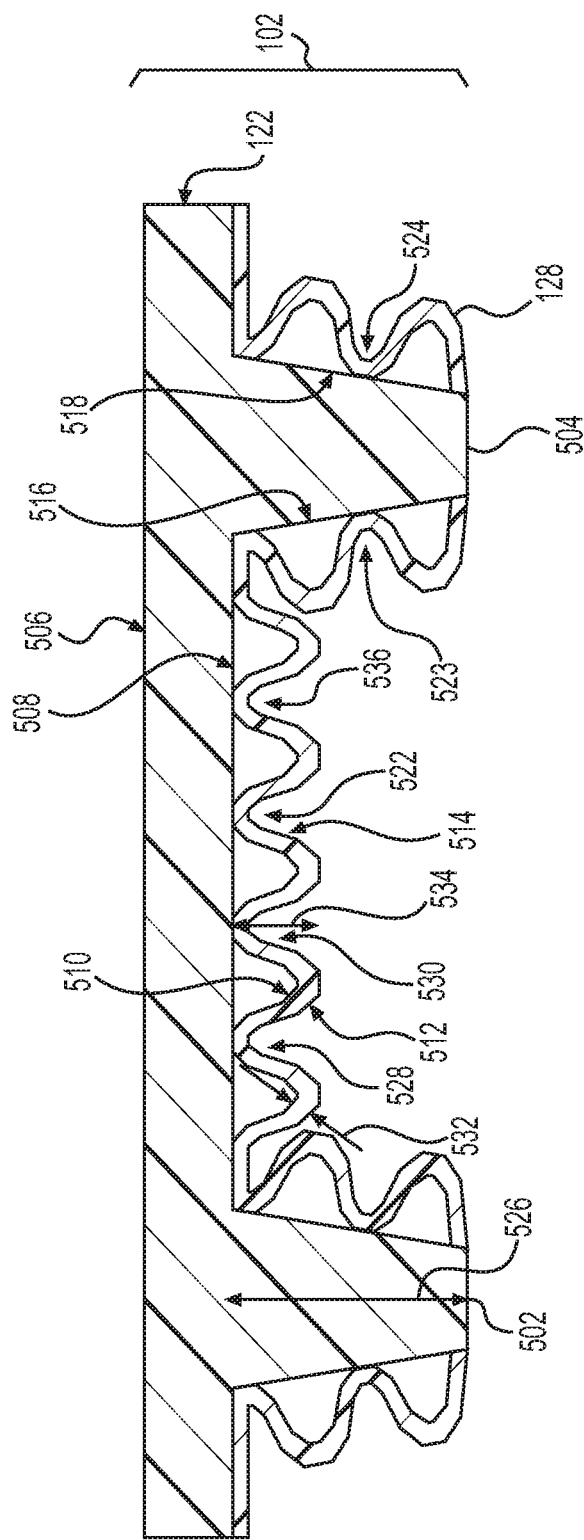
FIG. 5 is a cross-sectional view of an embodiment of a sole structure.

FIG. 5 is a cross-sectional view of an embodiment of a sole structure. The sole structure 102 may include sole plate 122 having first stud 502 and a second stud 504 fixed or molded to the sole plate and outer sole assembly 128. The second stud 504 may have first side portion 516 and second side portion 518. Outer sole assembly 128 may include one or more frusto-conical structures 514 located adjacent to the first lower surface 508 of the sole plate 122. Also, one or more frusto-conical structures 514 may be located adjacent to the first side portion 516 and second side portion 518 of second stud 504. In the exemplary embodiment, sole plate 122 may have a first upper surface 506 and a first lower surface 508. Outer sole assembly 128 may have a second upper surface 510 and a ground contacting surface 512. A plurality of frusto-conical structures 514 may be located adjacent to the first lower surface 508 of the sole plate 122. The outer sole assembly 128 may have recesses 522 with frusto-conical structures 514 extending from the ground contacting surface 512 towards the first lower surface 508 of the sole plate 122. The outer sole assembly 128 may also have recesses 523 with frusto-conical structures 514 extending from the ground contacting surface 512 towards the first side portion 516 of the second stud 504. The outer sole assembly may also have recesses 524 with frusto-conical structures 514 extending from the ground contacting surface 512 towards the second side portion 518 of the second stud 504. A design and configuration of multiple frusto-conical structures may be selected that is suitable for a desired configuration of an article of footwear 100 and its intended use.

In different embodiments, frusto-conical structures may have varying widths. First frusto-conical structure 528 may generally be wider than first stud 502. Alternatively, in other cases, first stud 502 may generally be wider than first frusto-conical structure 528. Still in other embodiments, first frusto-conical structure 528 may have the same width as first stud 502. In an exemplary embodiment, shown in FIG. 5, first stud 502 may be wider than first frusto-conical structure 528. In other embodiments, first frusto-conical structure 528 may have a different width from second frusto-conical structure 530. Alternatively, first frusto-conical structure 528 and second frusto-conical structure 530 may have the same width. In the exemplary embodiment, first frusto-conical structure 528 and second frusto-conical structure 530 may have the same width. Varying widths for the frusto-conical structures of the inner sole assembly may be selected that is suitable for a desired article of footwear 100 and intended use.

In different embodiments, frusto-conical structures may have varying heights. First frusto-conical structure 528 and second frusto-conical structure 530 may have varying heights. As used herein, the height of a frusto-conical structure may be determined as the distance between a lowest portion of the frusto-conical structure (e.g., the furthest from sole plate 122) and the first lower surface 508 of sole plate 122. First frusto-conical structure 528 and second frusto-conical structure 530 could have varying heights that are approximately 10% to 30% of the stud height 526. As used herein, the height of a stud may be determined as the distance between a tip (or end) of the stud and a lower surface of sole plate 122. In some cases, first frusto-conical structure 528 may have a height that is 15% of the stud height 526. In other cases, first frusto-conical structure 528 may have a height that is approximately 30% of the stud height 526. In some embodiments, outer sole assembly 128 may have one or more frusto-conical structures, with each frusto-conical structure having a different height. For example, a frusto-conical structure located on the forefoot surface may have a height that is 15% of the stud height 526, while a frusto-conical structure located on the midsole surface may have a height that is 20% of the stud height 526, and a frusto-conical structure located on the heel surface may have a height that is 30% of the stud height 526. In the exemplary embodiment shown in FIG. 5, first frusto-conical structure 528 may have a height that is 25% of the stud height 526 and second frusto-conical structure 530 may also have a height that is 25% of the stud height 526. The frusto-conical structures of outer sole assembly may have any combination of heights in relation to the stud height. Varying heights for the frusto-conical structure of the outer sole assembly may be selected that is suitable for a desired article of footwear 100 and intended use.

Although the exemplary embodiment provides for a first frusto-conical structure 528, in some other embodiments an outer sole assembly could include structures with different geometries of varying sizes and shapes. Such structures could have circular, oval, irregular, cylindrical, polygonal, rectangular, conical, elliptical, symmetrical, non-symmetrical, tear drop, geometric, non-geometric, coned-disc shaped, or cupped spring shaped as well as other kinds of shapes. In an exemplary embodiment, frusto-conical structures may be coned-disc shaped with varying sizes. In some cases, first frusto-conical structure 528 may have a different size than second frusto-conical structure 530. Alternatively, in other cases, first frusto-conical structure 528 may have the same size as second frusto-conical structure 530. A number and configuration of first frusto-conical structure 528 and second frusto-conical structure 530 may be selected that is suitable for a desired article of footwear and intended use. In the exemplary embodiment shown in FIG. 5, first frusto-conical structure 528 and second frusto-conical structure 530 may both be coned-disc shaped with the same size.

The outer sole assembly 128 could be made of a variety of different materials. In some embodiments, the outer sole assembly 128 may be any material with similar characteristics as a polyurethane plastic, such as, thermoplastic elastomer, elastic material, rubber material, resilient material, polyether block amide, polyester thermoplastic polyurethane, polyether thermoplastic polyurethane as well as any other material. In some embodiments, the outer sole assembly 128 may have ethylene vinyl alcohol polymer content. In an exemplary embodiment, the outer sole assembly 128 may be manufactured from a polyester thermoplastic polyurethane with a durometer value in the range between 50 Shore A to 95 Shore A.

In some embodiments, the outer sole assembly 128 may have varying thickness 532. In some embodiments, the thickness 532 of outer sole assembly could range from 0.02 inches to 0.1 inches. In the exemplary embodiment, the thickness 532 of outer sole assembly 128 could be approximately 0.045 inches.

The sole structure of the article of footwear may have variable compressibility or resiliency factors. For example, sole plate 122 may have a first compressibility or resiliency factor. Outer sole assembly 128 may have a second compressibility or resiliency factor. The first compressibility or resiliency factor of sole plate 122 may be less than the second compressibility or resiliency factor of the outer sole assembly 128. Sole plate 122 may be formed from a hard plastic or synthetic that comes into contact with the ground surface that is not compressible or resilient. The outer sole assembly 128 may be formed from a resilient material that also comes into contact with the ground surface. In an exemplary embodiment, the sole structure 102 provides a ground contacting surface that has hard portions as well as soft, resilient portions.

In active use of the article of footwear, the sole structure may be in varying states or conditions. The sole structure could be in a resting state, partial ground penetration state, full ground penetration state or any other state during active use of the article of footwear. In some embodiments, the gap or reference portion 534 between the sole plate 122 and outer sole assembly 128 may vary depending on the particular state of the sole structure. As used herein, the reference portion 534 is the dimension between the first lower surface 508 of the sole plate 122 and ground contacting surface 512 of outer sole assembly 128. In the exemplary embodiment, reference portion 534 may have a variable dimension depending on the state of the sole structure.

The sole structure of the article of footwear may be subjected to varying tests and field research to determine the amount of ground surface material that could accumulate on the sole structure. In some embodiments, the article of footwear could be subjected to actual game play situations. The games could be any sport, such as, soccer, football, baseball, field hockey, lacrosse, softball, rugby, cross-country or any sport using an article of footwear with traction elements on the sole structure. The ground surfaces could be any ground surface material that could accumulate on the sole structure of an article of footwear, such as, mud, dirt, grass, turf, or any other material either wet or dry. In the exemplary embodiment, following a thirty (30) minute wear test on a wet grass field, a weight of the debris adhered to the sole structure is at least 15% less than a weight of debris adhered to an exterior surface of a control sole structure. The control sole structure may be identical to the sole structure except that the control sole structure does not include the outer sole assembly.

Figure 6:
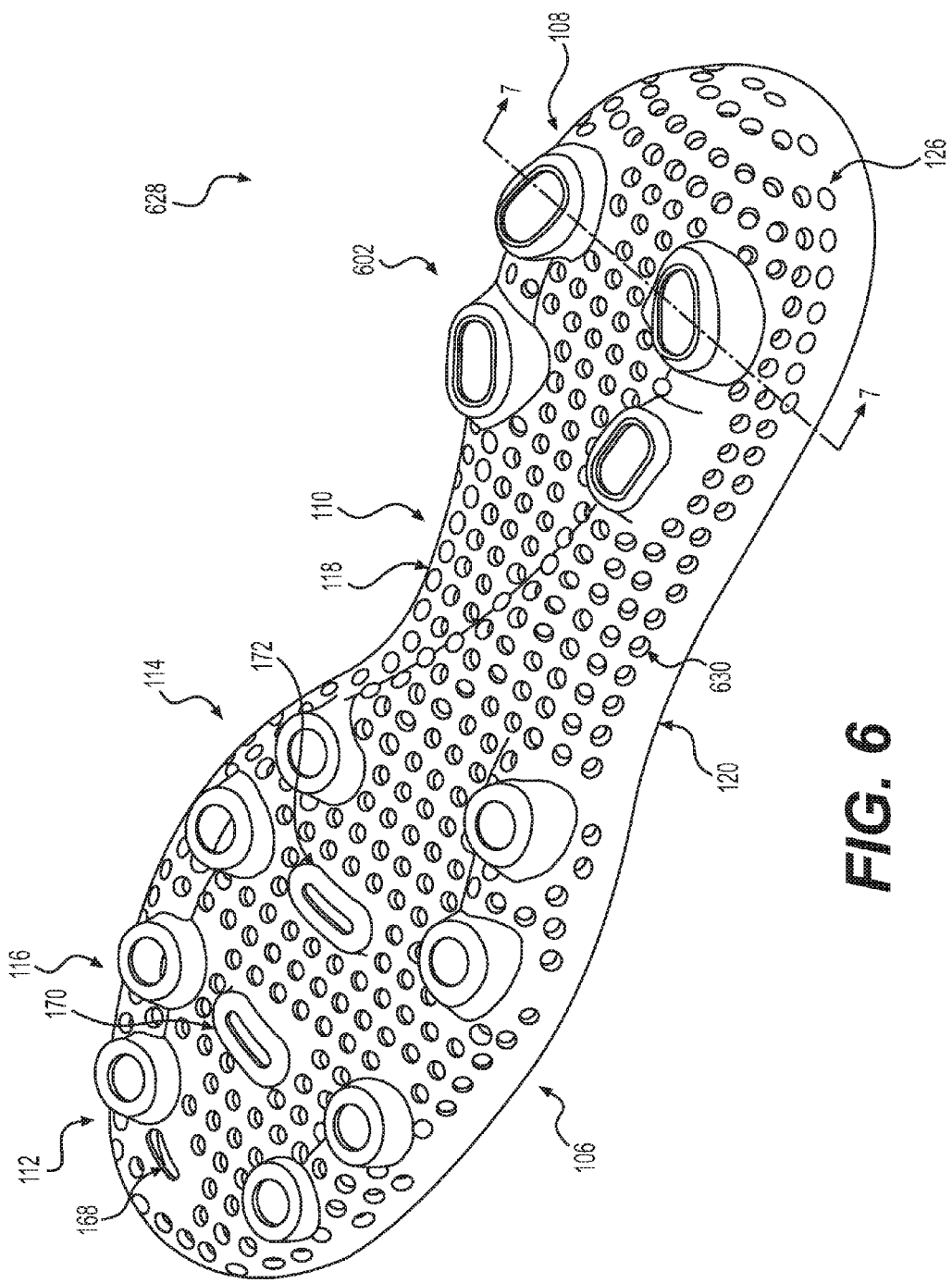
FIG. 6 is an isometric view of a lower surface of another embodiment of the outer sole assembly.

FIG. 6 shows an isometric view of the ground contacting surface 126 of the outer sole assembly 628. As shown in FIG. 6, in some embodiments, an outer sole assembly 628 may include multiple frusto-conical structures 630. In some embodiments, one or more frusto-conical structures may be concentrated in the forefoot region 106. In other embodiments, one or more frusto-conical structures may be situated in the mid-foot region 110. Also, there could be one or more frusto-conical structures in the heel region 608. In the exemplary embodiment, a plurality of frusto-conical structures 630 are located throughout the outsole.

The outer sole assembly 628 may have extended portions 602 that extend from the ground contacting surface 126 of the outer sole assembly 628. In the exemplary embodiment, the extended portions 602 may not have frusto-conical structures 630 located on the ground contacting surface 126 of the extended portions 602. In the exemplary embodiment, some of the plurality of frusto-conical structures 630 are located between the extended portions 602. A design and configuration of multiple frusto-conical structures 630 may be selected that is suitable for a desired configuration of an article of footwear 100 and its intended use.

Figure 7:
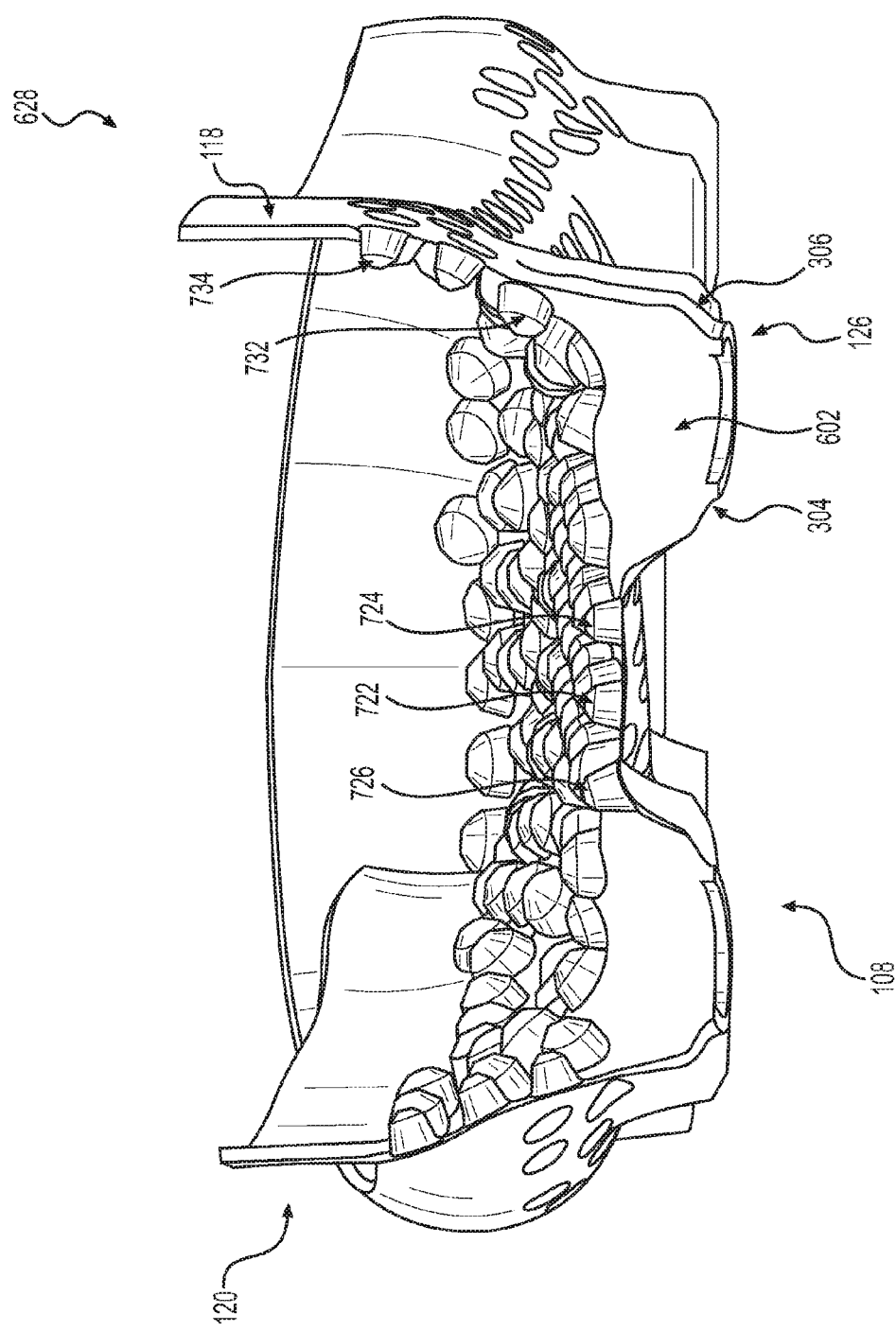
FIG. 7 is a cross-section view of an embodiment of the outer sole assembly of FIG. 6 taken along line 7-7.

FIG. 7 is a cross-section view of the outer sole assembly 628 taken along 7-7 of FIG. 6. In some embodiments, one or more frusto-conical structures may be located throughout the outsole of the outer sole assembly 628. As shown in FIG. 7, in the exemplary embodiment, first frusto-conical structure 726, second frusto-conical structure 722, and third frusto-conical structure 724 may be located on the heel region 108 of the outer sole assembly 628. In some embodiments, the extended portion 602 may have first side portion 304 and second side portion 306. As shown in FIG. 7, first side portion 304 and second side portion 306 may not have frusto-conical structures on the ground contacting surface 126.

In some embodiments, one or more frusto-conical structures may be located on the lateral side 120 or medial side 118 of the outer sole assembly 628. As shown in FIG. 7, in the exemplary embodiment, fourth frusto-conical structure 732 and fifth frusto-conical structure 734 may be located on the medial side 118 of the outer sole assembly 628. A design and configuration of multiple frusto-conical structures may be selected that is suitable for a desired configuration of an article of footwear 100 and its intended use.

Figure 8:
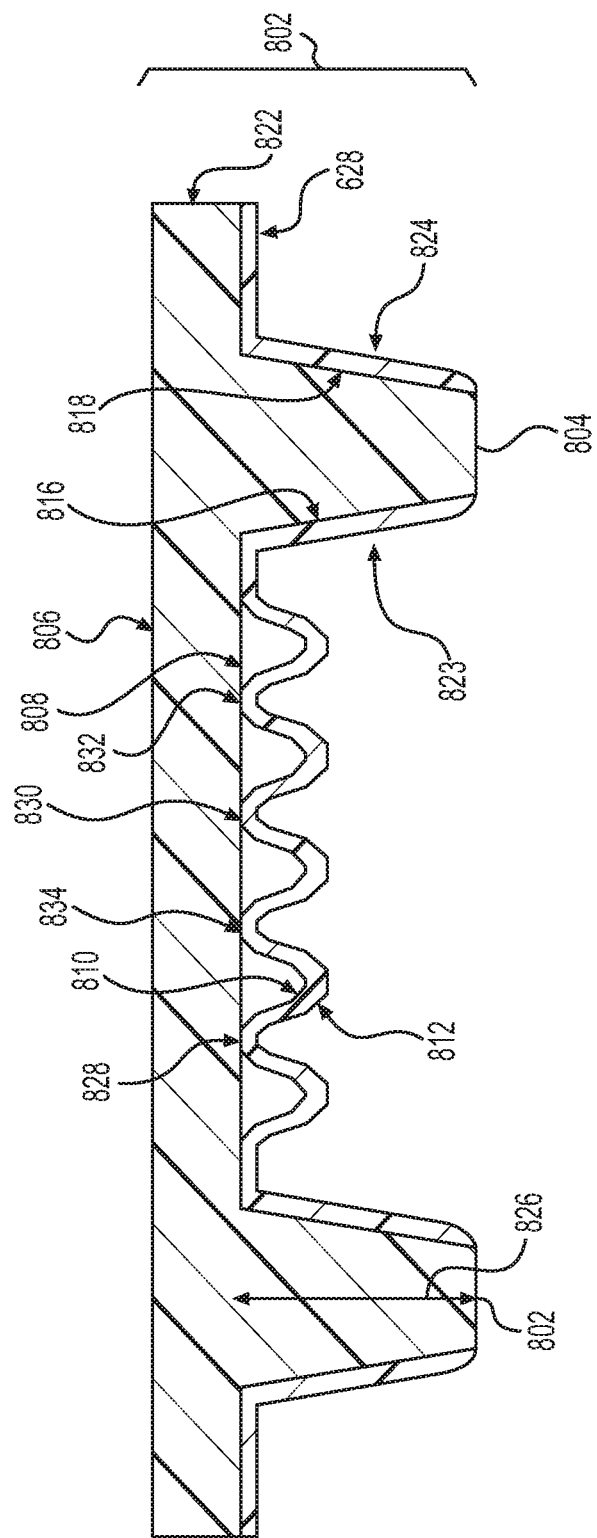
FIG. 8 is a cross-sectional view of another embodiment of a sole structure.

FIG. 8 is a cross-sectional view of an embodiment of a sole structure. The sole structure 802 may include sole plate 822 having first stud 802 and a second stud 804 fixed or molded to the sole plate and outer sole assembly 628. The second stud 804 may have first side portion 816 and second side portion 818. In the exemplary embodiment, outer sole assembly first stud portion 823 may not have frusto-conical structures along first side portion 816. Outer sole assembly second stud portion 824 may not have frusto-conical structures along second side portion 818. Outer sole assembly 628 may include first frusto-conical structure 828, second frusto-conical structure 834, third frusto-conical structure 830 and fourth frusto-conical structure 832 located adjacent to the first lower surface 808 of the sole plate 822.

In the exemplary embodiment, sole plate 822 may have a first upper surface 806 and a first lower surface 808. Outer sole assembly 628 may have a second upper surface 810 and a ground contacting surface 812. The frusto-conical structures may have load portions adjacent to the first lower surface 808 of sole plate 822. A design and configuration of multiple frusto-conical structures may be selected that is suitable for a desired configuration of an article of footwear 100 and its intended use.

Figure 9:
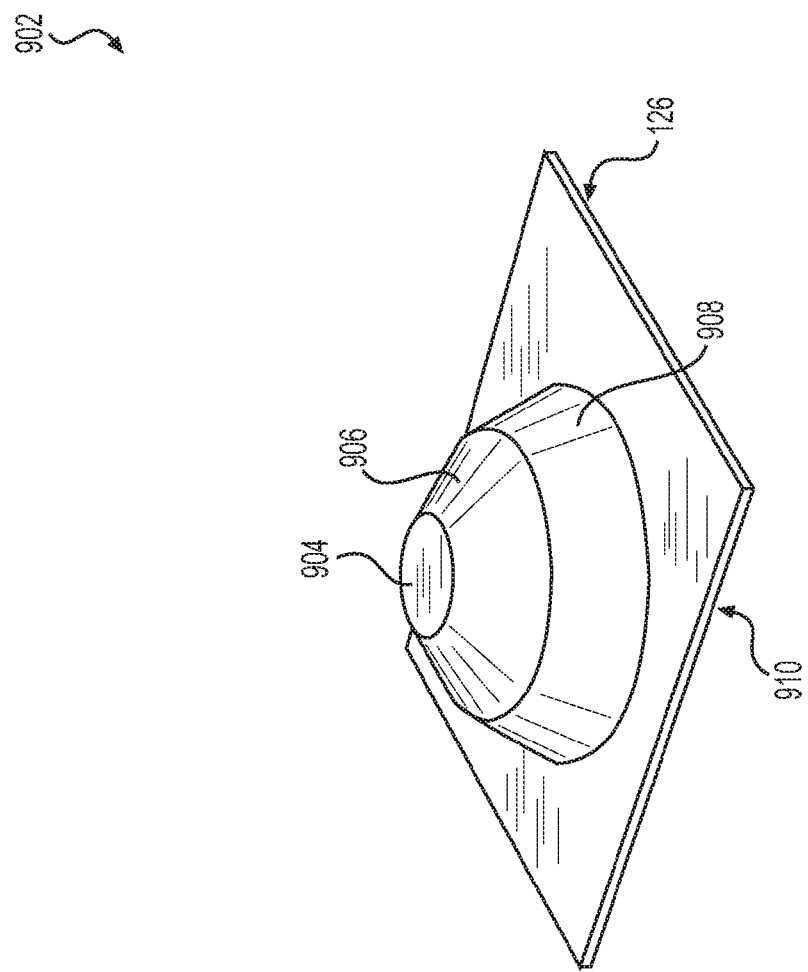
FIG. 9 is a perspective view of an embodiment of a frusto-conical structure of an outer sole assembly.

FIG. 9 shows a perspective view a frusto-conical structure 902 of outer sole assembly 128. Frusto-conical structure 902 may have a coned-disc shape having a load portion 904, spring portion 906, and base portion 908. The frusto-conical structure 902 may also have a recess portion 910 facing the ground contacting surface 126. A design and configuration of any frusto-conical structure may be selected that is suitable for a desired configuration of an article of footwear 100 and its intended use.

Figure 10:
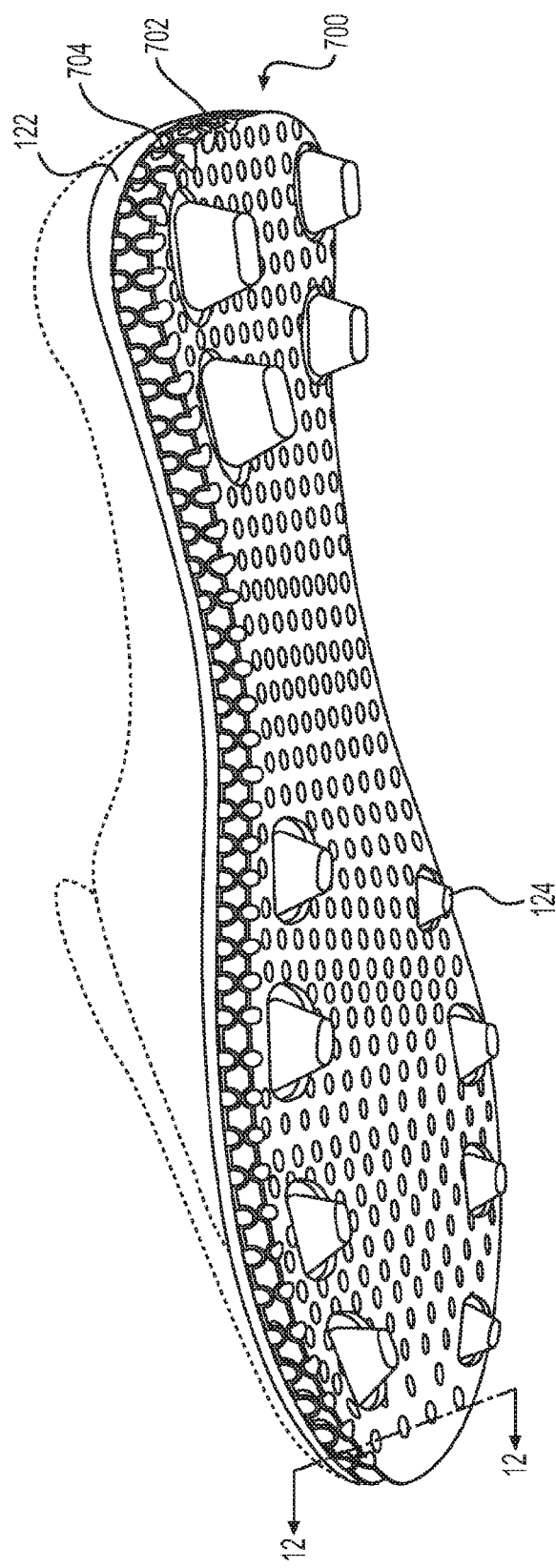
FIG. 10 is a schematic view of another embodiment of an article of footwear including an upper and a sole structure.
Figure 11:
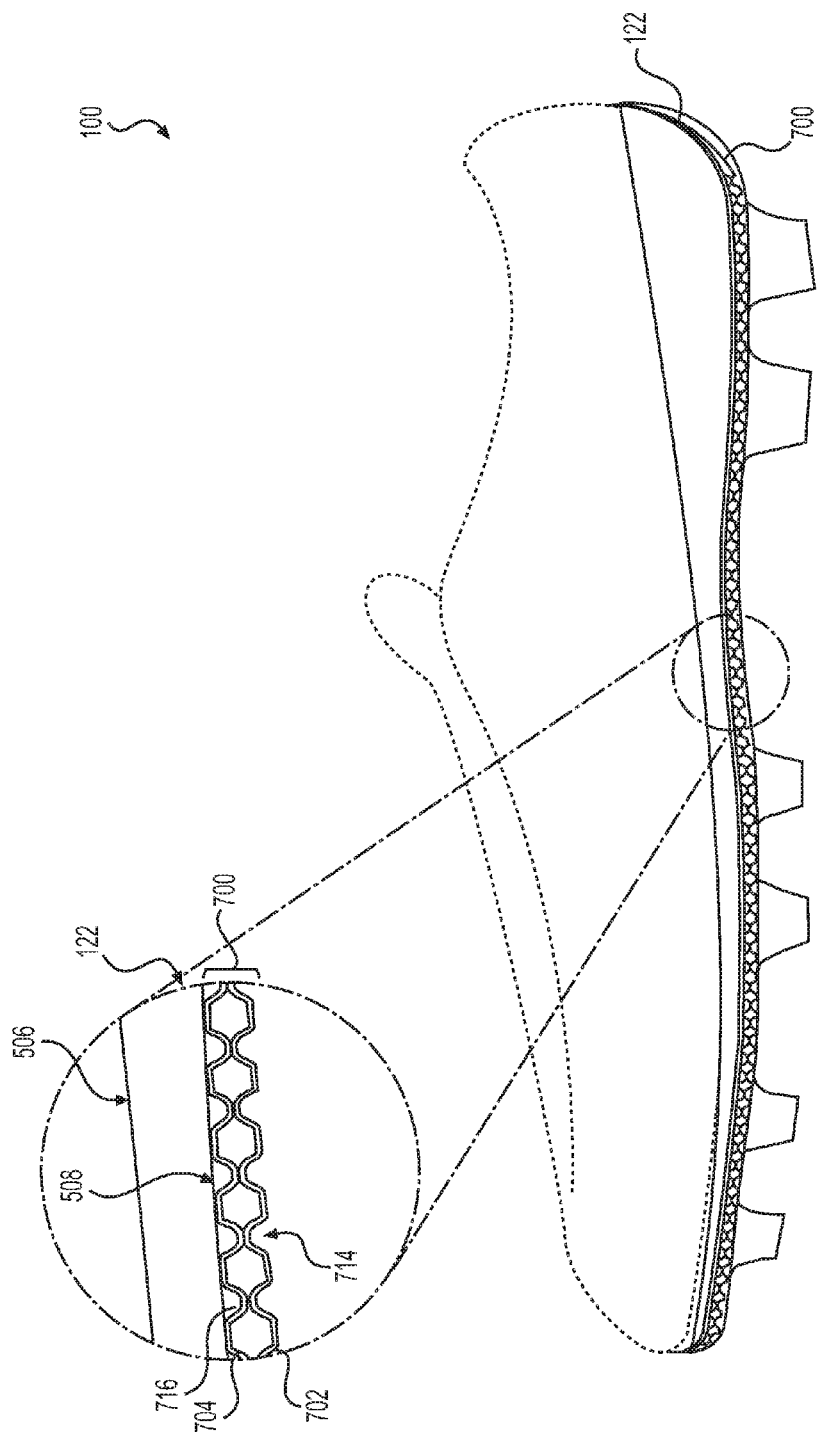
FIG. 11 is a side profile view of an embodiment of the article of footwear of FIG. 10.
Figure 12:
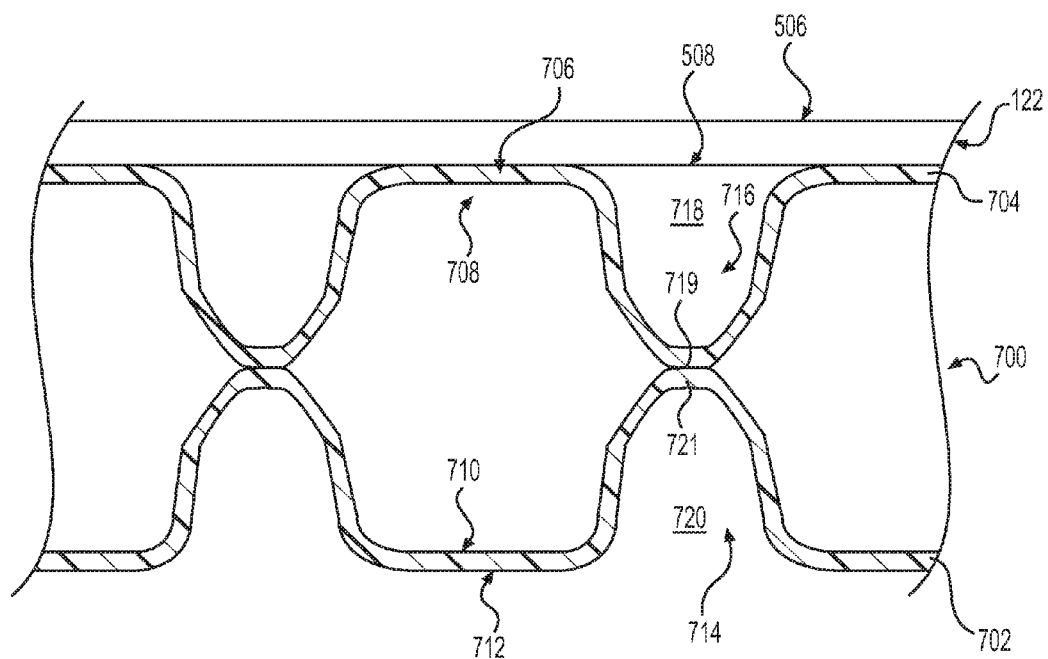
FIG. 12 is a cross-sectional view of an embodiment of the sole structure of FIG. 10 taken along line 12-12.

As shown in FIGS. 1-8, in some embodiments, the outer sole assembly may have a single layer. Alternatively, in some embodiments, the outer sole assembly may have one or more layers. FIGS. 10-12 show an article of footwear with outer sole assembly 700 as a double layer. Outer sole assembly 700 may have a third layer 704 and a second layer 702. Sole plate 122 may be adjacent to third layer 704. Third layer 704 may be adjacent to second layer 702.

FIG. 11 shows a side profile view of article of footwear 100 shown in FIG. 10 having a sole plate 122 and outer sole assembly 700. As shown in FIG. 11 in the enlarged view, outer sole assembly 700 may be placed on a first lower surface 508 of the sole plate 122. Outer sole assembly 700 may include a third layer of frusto-conical structures 716 and a second layer of frusto-conical structures 714.

FIG. 12 shows a cross-section view taken along 12-12 of FIG. 10. Outer sole assembly 700 may have a first layer as a sole plate 122 having a first upper surface 506 and first lower surface 508. Sole plate 122 may be adjacent to third layer 704. Third layer 704 may have a third upper surface 706 and third lower surface 708. Third layer 704 may be adjacent to second layer 702. Second layer 702 may have second upper surface 710 and ground contacting surface 712. Third layer 704 may have one or more frusto-conical structures 716. Second layer 702 may also have one or more frusto-conical structures 714. Frusto-conical structure 716 may have a recess portion 718 facing the first lower surface 508 of sole plate 122 and a load portion 719 facing the second upper surface 710 of second layer 702. Frusto-conical structure 714 may have a recess portion 720 facing the ground contacting surface 712 and a load portion 721 facing the third lower surface 708 of third layer 704. The load portion 719 of frusto-conical structure 716 may abut or touch the load portion 721 of frusto-conical structure 714. Outer sole assembly 700 may be positioned along any portion of the sole plate 122. In the exemplary embodiment, outer sole assembly 700 may be position throughout the first lower surface 508 and positioned around the studs 124. A design and configuration of any frusto-conical structure with one or more layers may be selected that is suitable for a desired configuration of an article of footwear 100 and its intended use.

Figure 13:
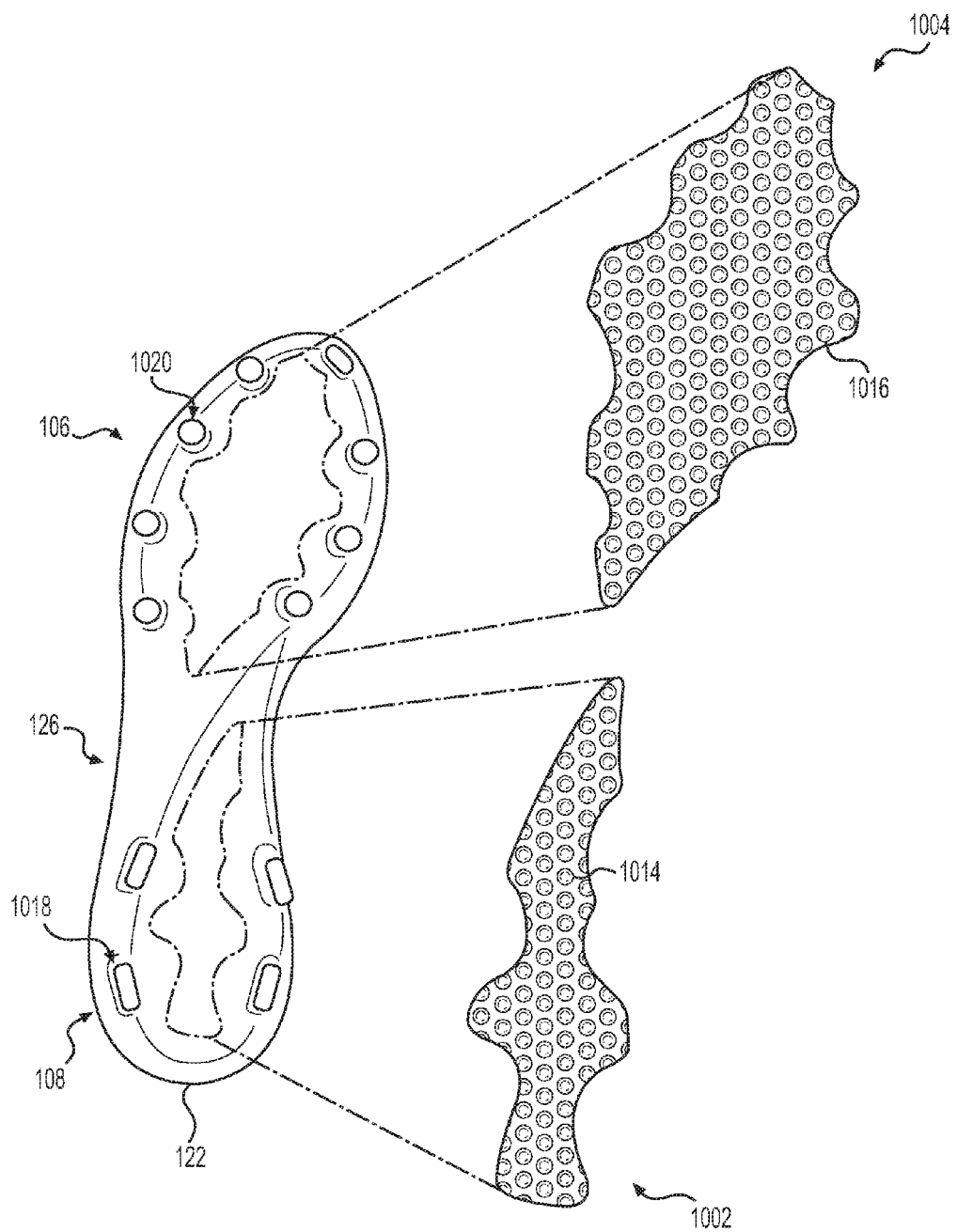
FIG. 13 is an exploded view of another embodiment of a sole structure.

FIG. 13 shows an exploded view of another embodiment of an article of footwear with sole plate 122, first outer sole assembly 1002 and second outer sole assembly 1004. Sole plate 122 may have a plurality of studs 1018 in the heel region 108. Sole plate 122 may have a plurality of studs 1020 in the forefoot region 106. First outer sole assembly 1002 may have a plurality of frusto-conical structures 1014 having load portions adjacent the sole plate 122 and recess portions exposed to the ground. Second outer sole assembly 1004 may have a plurality of frusto-conical structures 1016 having load portions adjacent the sole plate 122 and recess portions exposed to the ground.

Figure 14:
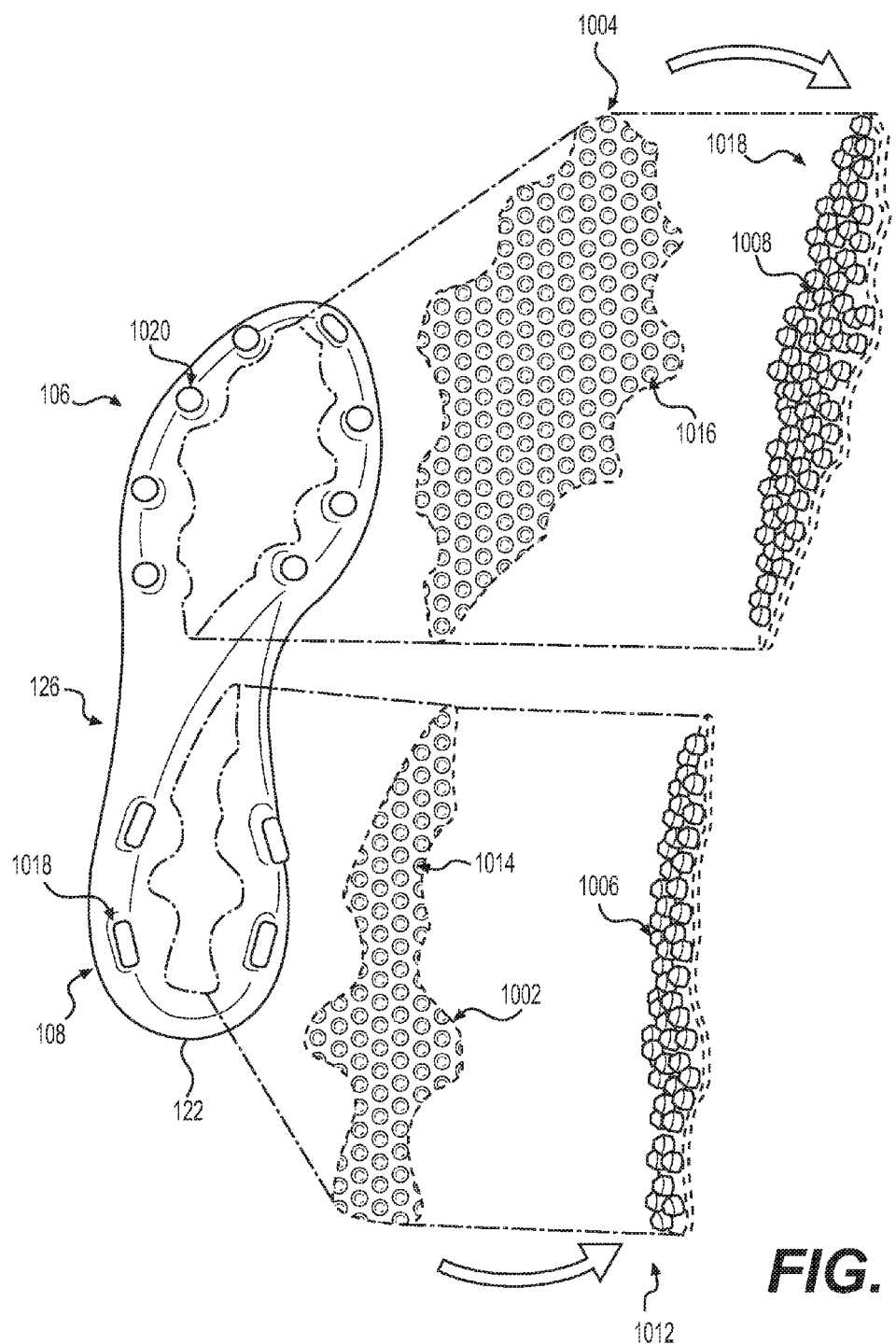
FIG. 14 is a double sided view of the embodiment of FIG. 13.

FIG. 14 shows a double sided view of the embodiment of FIG. 13. First outer sole assembly 1002 may have first inner side portion 1012. The first inner side portion 1012 may be adjacent to sole plate 122. First outer sole assembly 1002 may have a plurality of frusto-conical structures 1014 protruding away from the ground contacting surface 126. The plurality of frusto-conical structures 1014 may extend from the first inner side portion 1012 towards the sole plate 122. The plurality of frusto-conical structures 1014 may have load portions 1006 that are adjacent to the sole plate 122. The plurality of frusto-conical structures 1014 may have recess portions exposed to the ground. The plurality of frusto-conical structures 1014 may have a resilient characteristic to prevent ground surface material from accumulating on the ground contacting surface 126.

Second outer sole assembly 1004 may have second inner side portion 1018. The second inner side portion 1018 may be adjacent to sole plate 122. Second outer sole assembly 1004 may have a plurality of frusto-conical structures 1016 protruding away from the ground contacting surface 126. The plurality of frusto-conical structures 1016 may extend from the second inner side portion 1018 towards the sole plate 122. The plurality of frusto-conical structures 1016 may have load portions 1008 that are adjacent to the sole plate 122. The plurality of frusto-conical structures 1016 may have recess portions exposed to the ground. The plurality of frusto-conical structures 1016 may have a resilient characteristic to prevent ground surface material from accumulating on the ground contacting surface 126.

In some embodiments, first outer sole assembly 1002 and second outer sole assembly 1004 may be positioned along any portion of the sole plate 122. In the exemplary embodiment, first outer sole assembly 1002 may be placed on the heel region 108 of the sole plate 122. First outer sole assembly 1002 may be configured to be placed in the vicinity of the plurality of studs 1018. Second outer sole assembly 1004 may be placed on the forefoot region 106 of the sole plate 122. Second outer sole assembly 1004 may be configured to be placed in the vicinity of the plurality of studs 1020. A design and configuration of any frusto-conical structure with one or more layers may be selected that is suitable for a desired configuration of an article of footwear 100 and its intended use.

Figure 15:
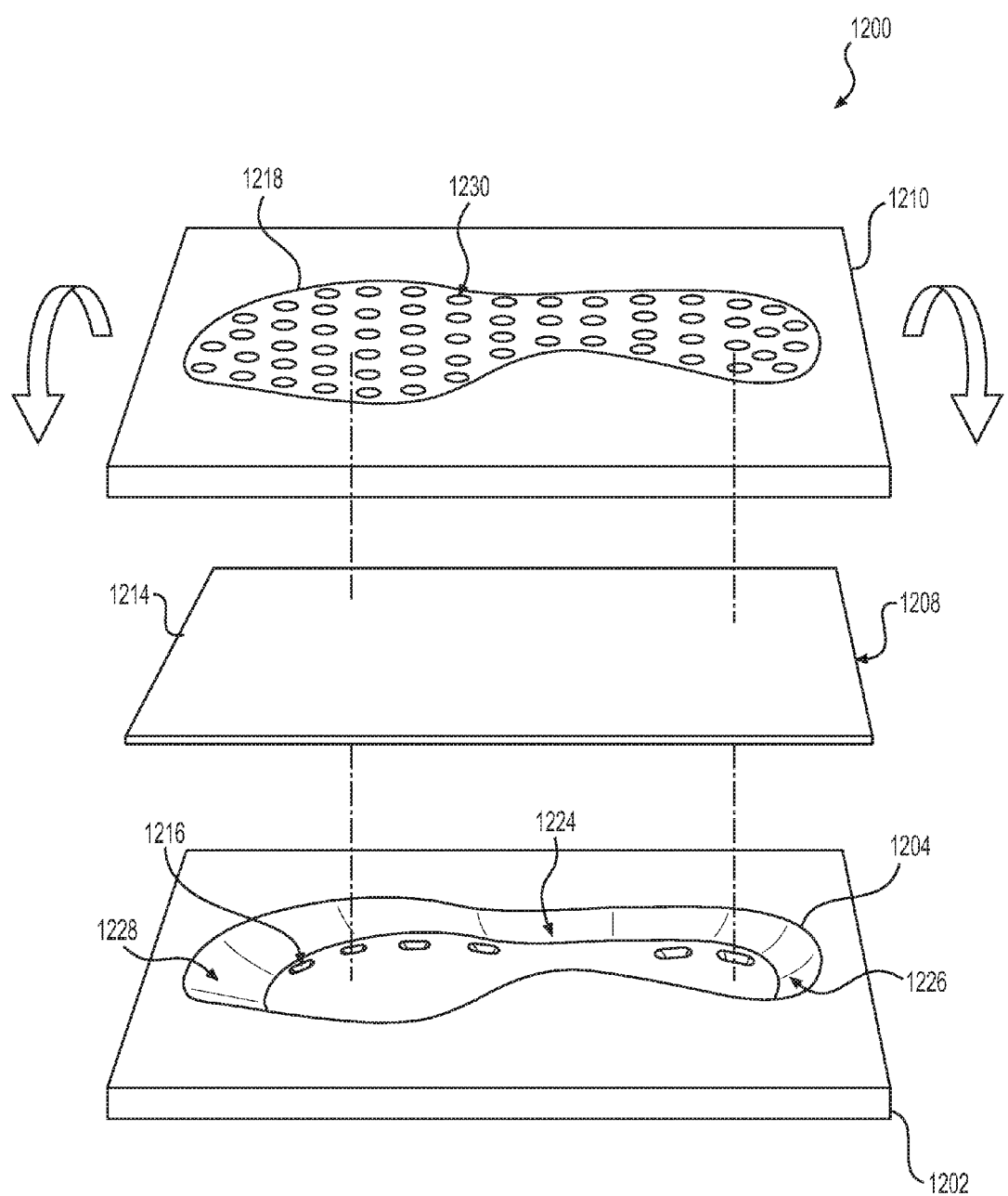
FIG. 15 is an exploded view of an embodiment of a molding system for making an outer sole assembly.
Figure 16:
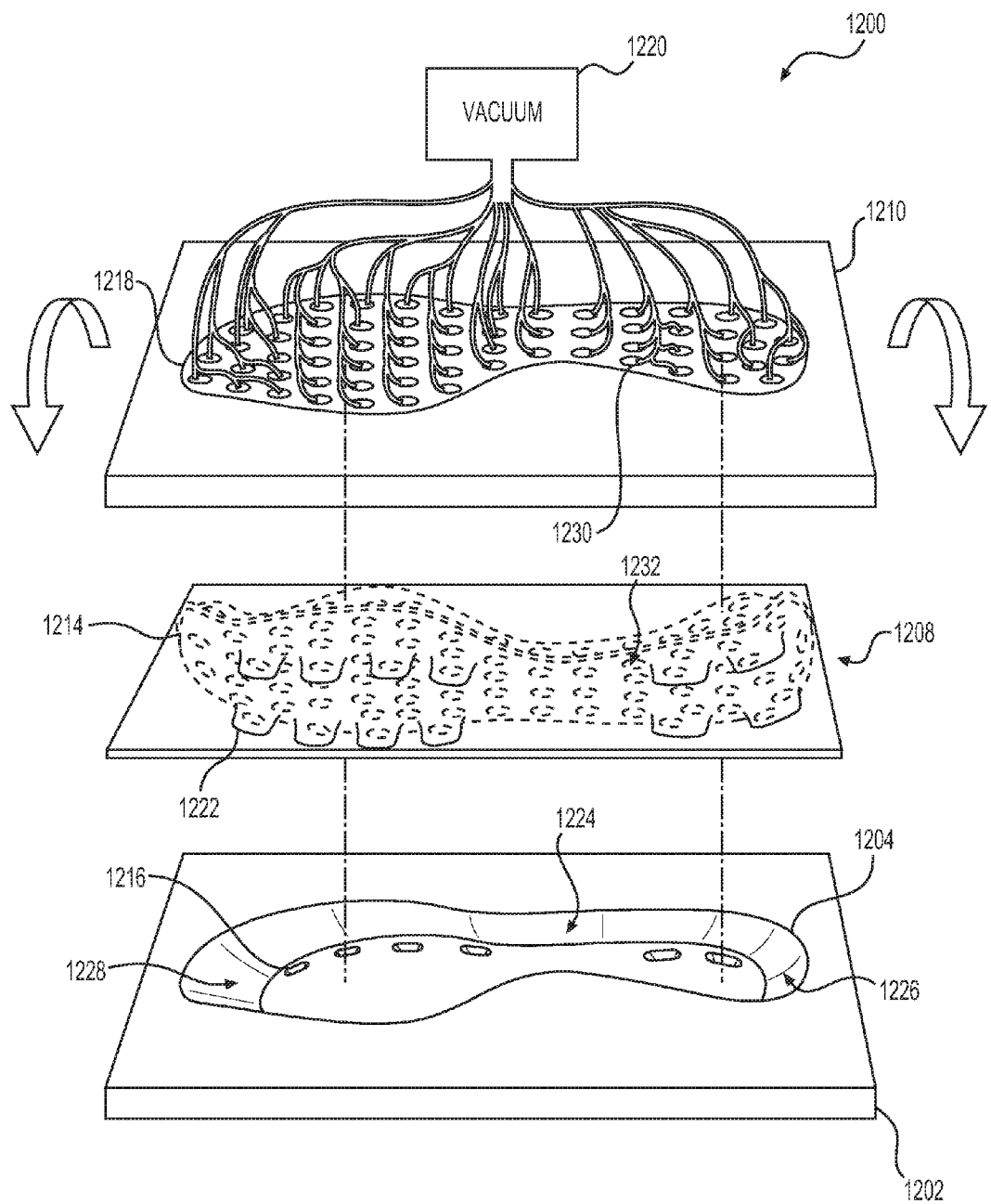
FIG. 16 is an exploded view of an embodiment of a molding system for making an outer sole assembly by using a vacuum system.

In a molding process of FIGS. 15 and 16, first layer 1214 may be disposed between the lower mold plate 1202 and the upper mold plate 1210 in registration with the at least one lower mold cavity 1204 and at least one upper mold cavity 1218. The molding process may include any known or later developed heat treatment and/or pressure treatment process, optionally with vacuum 1220. Also, a pore changing adapter molding process or any other known or later developed molding process may be used. As shown in FIG. 16, in some embodiments, in the molding process the first layer 1214 may be drawn by vacuum 1220 into the upper mold cavity 1218 and take a shape and configuration conforming to the shape and configuration of a mold surface of the upper mold plate 1210.

FIGS. 15 and 16 illustrate an embodiment of a molding system 1200 for molding outer sole assembly 1208. FIG. 15 shows the outer sole assembly 1208 prior to molding. FIG. 16 shows the outer sole assembly 1208 after the molding process. As shown in FIGS. 15 and 16, lower mold plate 1202 may include at least one lower mold cavity 1204 for molding outer sole assembly 1208. In some embodiments, lower mold plate 1202 may include recesses 1216 for molding extended portions 1222 of the outer sole assembly 1208. Lower mold plate 1202 may also have side walls 1224, heel cup 1226, and toe cup 1228 to configure the outer sole assembly 1208 to have an interference fit with a sole plate.

As shown in FIG. 15, a first layer 1214 may be a flat sheet. Upper mold plate 1210 may have a cavity 1218 with a similar shape as the contour of the lower mold cavity 1204. Upper mold cavity may have recesses 1230 to form the frusto-conical structures 1232. Frusto-conical structures 1232 may be formed by the flat first layer 1214.

FIG. 16 illustrates an embodiment of a molding system 1200 for molding outer sole assembly 1208 with a vacuum system 1220. FIG. 16 shows the outer sole assembly 1208 after the molding process. First layer 1214 may be drawn by vacuum system 1220 into the upper mold cavity 1218 to form the frusto-conical structures 1232.

Mold materials for a molding process in the molding system of FIGS. 15 and 16 may be any known or later developed molding materials suitable for a desired sole structure. In some embodiments, the molding material may be any form of a plastic material. In different embodiments, however, various types of molding material may be used to form an outer sole assembly 1208 using molding system 1200. In some embodiments, the molding material may include, but is not limited to, any one or more of the following materials: natural or synthetic rubber, hard foam, plastics, polymers, nylon, polyurethane, thermoplastic polyurethane, as well as any other deformable or rigid materials.

Any other materials may be used as the molding material. In addition, in some embodiments an inner sole assembly may be produced using more than one molding material. In an embodiment, the molding materials could be made of thermoplastic polyurethane.

The outer sole assembly may be attached to a sole plate by a variety of known or later developed methods suitable for a desired sole structure. In some embodiments, the outer sole assembly may be adhered to a sole plate with any form of an adhesive. In other embodiments, an outer sole assembly may be integrally formed with a sole plate during a molding process. In an exemplary embodiment, an outer sole assembly may have an interference fit with a sole plate. Heel cup, toe cup, and side walls of the outer sole assembly may wrap around the sole plate. The frusto-conical structures of the outer sole assembly and sole plate may be bonded together using radio frequency welding, high frequency welding, arc-welding, or ultrasonic cemented. Any form or method of bonding outer sole assembly to the sole plate may be utilized for a desired sole structure.

FIGS. 17 to 22 illustrate an exemplary operation of an embodiment of the sole structure 1702 having a sole plate 1722 and outer sole assembly 1780. As shown in FIGS. 17-22, in some embodiments a sole structure 1702 may operate to prevent accumulation of ground surface 1410 on a lower surface of an article of footwear in active use of the article of footwear.

Figure 17:
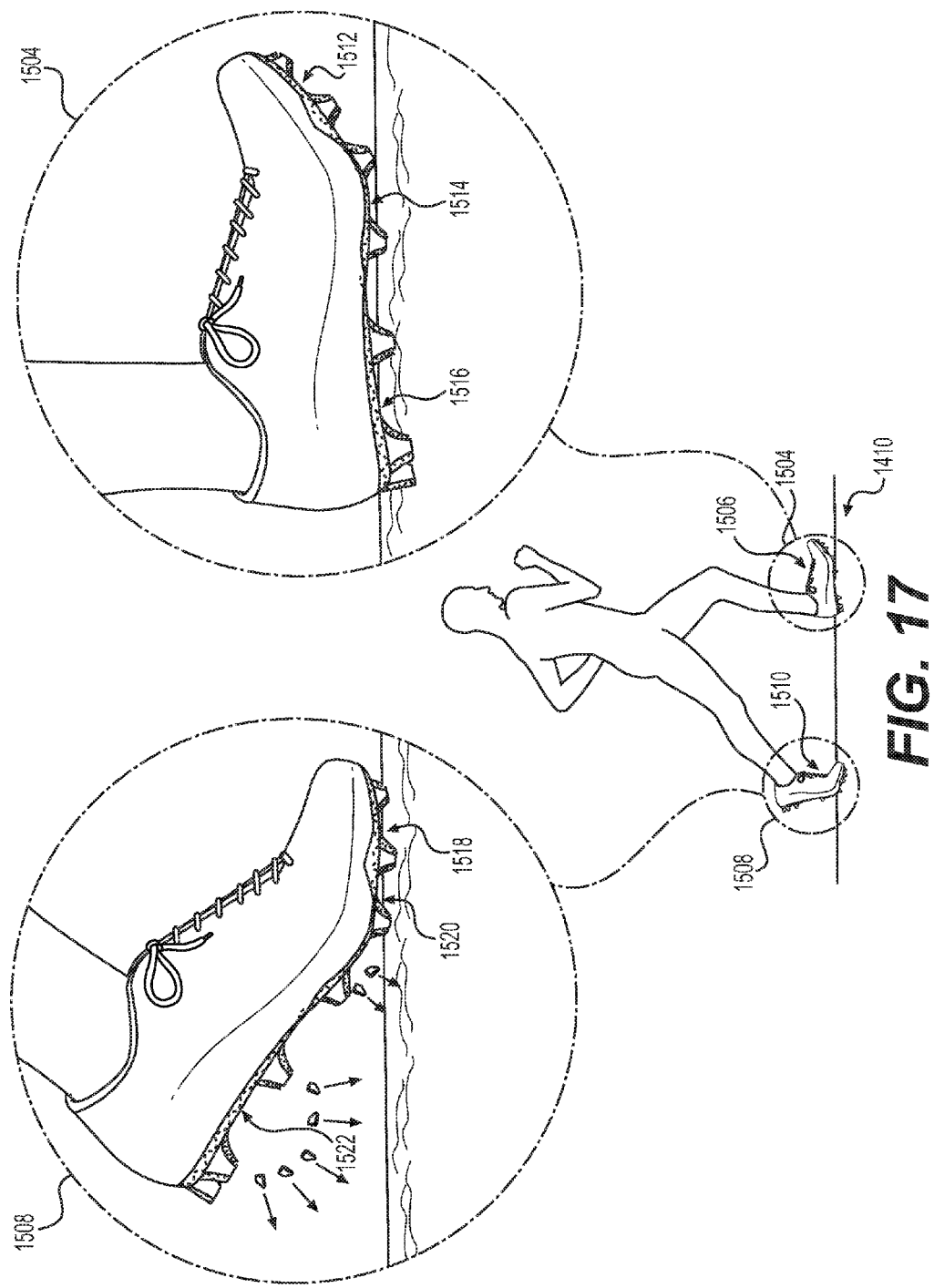
FIG. 17 is a schematic snap-shot profile view of an athlete, illustrating operation of an embodiment of an article of footwear including the sole structure.

FIG. 17 is a schematic snap-shot profile view of an athlete, illustrating functional characteristics and operation of an embodiment of a sole structure in active use of an article of footwear. In FIG. 17, an athlete is shown in stride during normal athletic activity, such as running, playing soccer or another sport, etc., on a ground surface. The ground surface 1410 may include compactable ground surface material, such as mud, grass, gravel, sand, clay, slush (snow, ice, or frost), etc., or various combinations thereof. In FIG. 17, the athlete's left foot 1506 is extended in front of the athlete's body in a heel strike state 1504 of a stride cycle, where a strike force and weight of the athlete is being transmitted to the ground surface. In this manner, a compression force between the sole structure of the article of footwear and the ground surface is progressively generated in the heel region to the toe region of the article of footwear. In FIG. 17, the athlete's right foot 1510 is extended in back of the athlete's body in a toe off state 1508 of a stride cycle, where a force and weight of the athlete generally is released. In this manner, a compression force between the sole structure of the article of footwear and the ground surface is progressively released from the heel region to the toe region of the article of footwear.

In FIG. 17, the heel strike state 1504 is shown in enlarged view in the upper right hand portion of the figure, and the toe off state 1508 is shown in enlarged view in the upper left hand portion of the figure. Although functional characteristics and operation of the sole structure are described in FIG. 17 with respect to a stride cycle including heel strike and toe off states, this stride cycle is exemplary only to illustrate different functional characteristics and operation states of the sole structure in active use of the article of footwear. The sole structure may be used with similar functional characteristics and operation in other stride cycles or methods of active use of the article of footwear, such as running on the balls of the feet, running with a lateral mid-foot strike cycle, trapping a soccer ball, or any other active movement.

Figure 18:
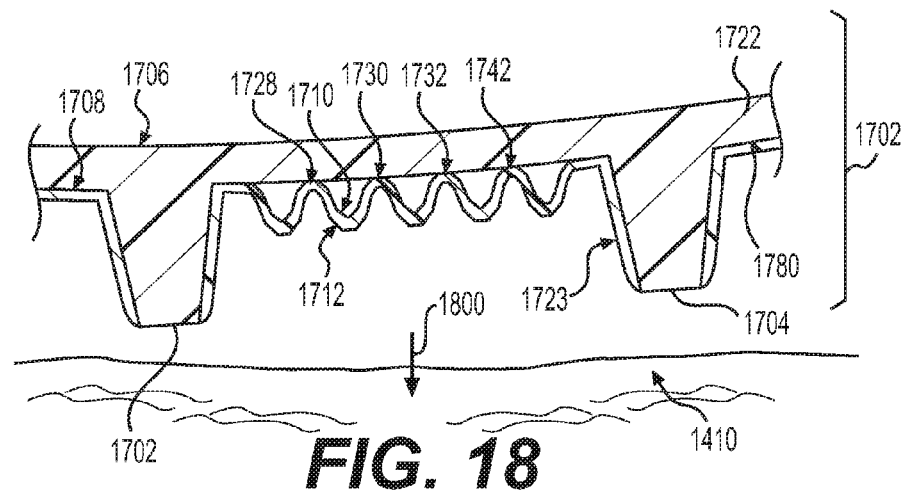
FIG. 18 is a schematic sectional view illustrating the sole structure in a pre-surface strike state of the stride cycle.
Figure 20:
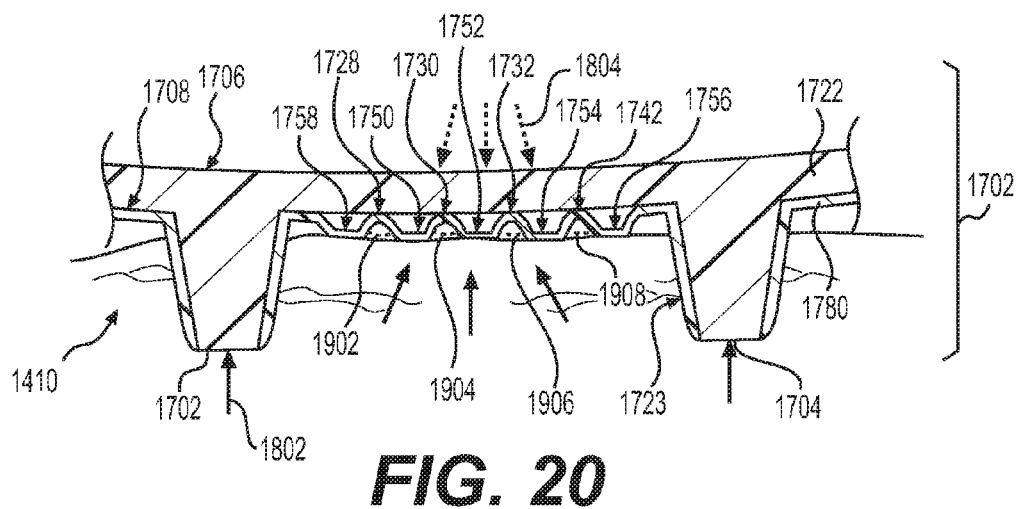
FIG. 20 is a schematic sectional view illustrating the sole structure in a full ground penetration/compression state of the stride cycle.

In the exemplary stride cycle shown in FIG. 17, a first article of footwear (left shoe) 1506 is shown with frusto-conical structure in three different operation states associated with a heel strike state 1504 of the stride cycle. A first frusto-conical structure 1512 located in the toe region of the forefoot region is in a fully non-compressed state, where the spring portion of the frusto-conical structure may be fully extended in a coned-disc shape. FIG. 18 shows a frusto-conical structure in a fully non-compressed state. A second frusto-conical structure 1514 located in the ball of the foot region of the forefoot region is in a partially compressed state, where the spring portion of the frusto-conical structure may be partially collapsed into the recess of the frusto-conical structure. A third frusto-conical structure 1516 located in the heel region is in a fully compressed state, where the spring portion of the frusto-conical structure may be fully collapsed into the recess of the frusto-conical structure. FIG. 20 shows a frusto-conical structure in a fully compressed state.

Figure 22:
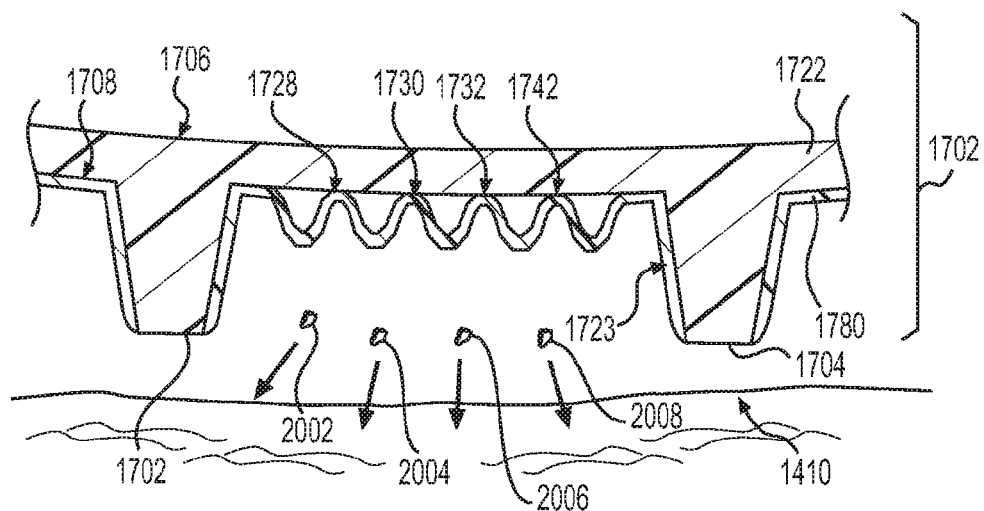
FIG. 22 is a schematic sectional view illustrating the sole structure in a full release state of the stride cycle.

In the exemplary stride cycle shown in FIG. 17, a second article of footwear (right shoe) 1510 is shown with frusto-conical structure in three different operation states associated with a toe off state 1508 of the stride cycle. A first frusto-conical structure 1518 located in the toe region of the forefoot area is in a fully compressed state, where the spring portion of the frusto-conical structure may be fully collapsed into the recess of the frusto-conical structure. In this state, a thrust force and weight of the athlete is being transferred to the ground surface. FIG. 20 shows a frusto-conical structure in a fully compressed state. A second frusto-conical structure 1520 located in the ball of the foot region of the forefoot region is in a partially compressed state, where the spring portion of the frusto-conical structure may be partially collapsed into the recess portion of the frusto-conical structure. A third frusto-conical structure 1522 located in the heel region is shown in a fully non-compressed state (fully released state), where the spring portion of the frusto-conical structure may be fully extended in a coned-disc shape. FIG. 22 shows a frusto-conical structure in a fully non-compressed state.

FIGS. 18-22 illustrate the operation of first frusto-conical structure 1728, second frusto-conical structure 1730, third frusto-conical structure 1732, and fourth frusto-conical structure 1742 of the outer sole assembly 1780 with respect to compression forces progressively generated and released between the article of footwear and the ground surface, to prevent accumulation of ground surface material on the lower surface of the article of footwear in active use. Although, only first frusto-conical structure 1728 will be discussed in the following operation of the sole structure. Performance of second frusto-conical structure 1730, third frusto-conical structure 1732, and fourth frusto-conical structure 1742 may also operate and function in a similar manner.

In FIGS. 18-22 an exemplary sole structure 1702 is shown in cross-sectional view to illustrate physical deformation associated with external compression forces applied to, and internal reactive spring forces generated by a first frusto-conical structure 1728 of the outer sole assembly 1780. FIGS. 18-22 show sole plate 1722 having a first stud 1702 and second stud 1704.

FIG. 18 is a schematic sectional view illustrating the sole structure 1702 of an article of footwear in a pre-surface strike state in an operation cycle of the structure. In this state, the article of footwear may be descending toward the ground surface 1410, as indicated by arrow 1800. As shown in FIG. 18, in this state, the first frusto-conical structure 1728 of the outer sole assembly 1780 is fully non-compressed and extended in a coned-disc shape.

Figure 19:
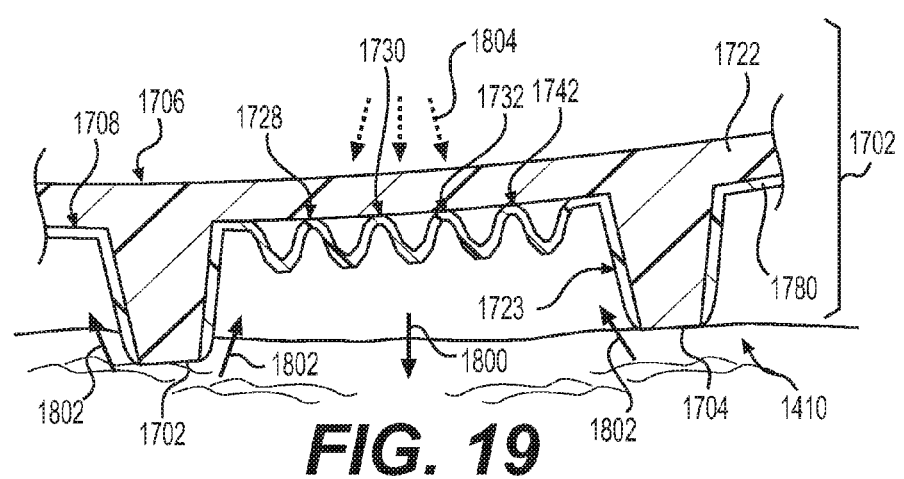
FIG. 19 is a schematic sectional view illustrating the sole structure in an initial surface strike state of the stride cycle.

FIG. 19 is a schematic sectional view illustrating the sole structure 1702 in an initial surface strike state in an operation cycle of the structure. In the initial surface strike state of FIG. 19, first stud 1702 and second stud 1706 may contact the ground surface 1410 in advance of the first frusto-conical structure 1728, which may be disposed above the ground surface 1410. In this state, first stud 1702 and second stud 1704 may begin to displace ground surface material. In this manner, a portion of ground surface material may be displaced into a recess portion of first frusto-conical structure 1728. The ground surface material, including displaced ground surface material, may begin to compact under the frusto-conical structure.

FIG. 20 is a schematic sectional view illustrating the sole structure 1702 in a full ground penetration state in an operation cycle of the structures. In the full ground penetration state of FIG. 20, the lower surface of the sole structure 1702 of the article of footwear begins to engage the ground surface 1410 with a compression force, as indicated by solid arrows 1802. A source of the compression force may include various factors, such as a force of weight of the athlete, a heel strike force, a thrust force (e.g., from an athlete changing a direction of stride or from a toe off push), and the like. Ground surface material located below the first frusto-conical structure 1728, including ground surface material displaced by a penetrating first stud 1702, may be compacted under the first frusto-conical structure 1728 by the compression force 1802. The compression force 1802 may begin to create a layer of compacted surface material (indicated by dashed line) 1902 disposed on the recess portion of the first frusto-conical structure 1728.

In the full ground penetration state illustrated in FIG. 20 the spring portion of the first frusto-conical structure 1728 of the outer sole assembly 1780 begins to deform by compression. Then, a portion of energy generated by the compression force 1802 may be absorbed by the first frusto-conical structure 1728 of the outer sole assembly 1780. This absorbed energy may be expressed as a reactive force 1804 generated in the first frusto-conical structure 1728 that is biased to return the spring portion of the first frusto-conical structure 1728 to a fully extended coned-disc shape. The reactive force 1804 generated by compression of the first frusto-conical structure 1728 is small relative to the compression force 1802 between the sole structure 1702 and the ground surface 1410. The reactive force 1804 generated by the energy absorbed by the first frusto-conical structure 1728 need only be sufficient to return the spring portion of the first frusto-conical structure 1728 to the fully extended coned-disc shape upon release of the compression force 1802, as discussed below. Energy of the athlete corresponding to the compression force 1802 is substantially transferred to the ground surface, with a portion of the energy being transferred to first frusto-conical structure 1728 of the outer sole assembly 1780.

The spring portion of the first frusto-conical structure 1728 of the outer sole assembly 1780 may be fully compressed. The compression force 1802 at the outer sole assembly 1780 may be at a maximum, with maximum transmission of the energy from the athlete to the ground surface. The compression force 1802 may be exerted across an entire surface area of the outer sole assembly 1780. As shown in FIG. 20, the compression force 1802 may be substantially greater than the reactive force 1804 absorbed and stored in first frusto-conical structure 1728 of outer sole assembly 1780. As shown in FIG. 20, in the full ground penetration state, the layer of compacted ground surface material (indicated by dashed line) 1902 may be formed on the recess portion of the first frusto-conical structure 1728 of the outer sole assembly 1780.

Figure 21:
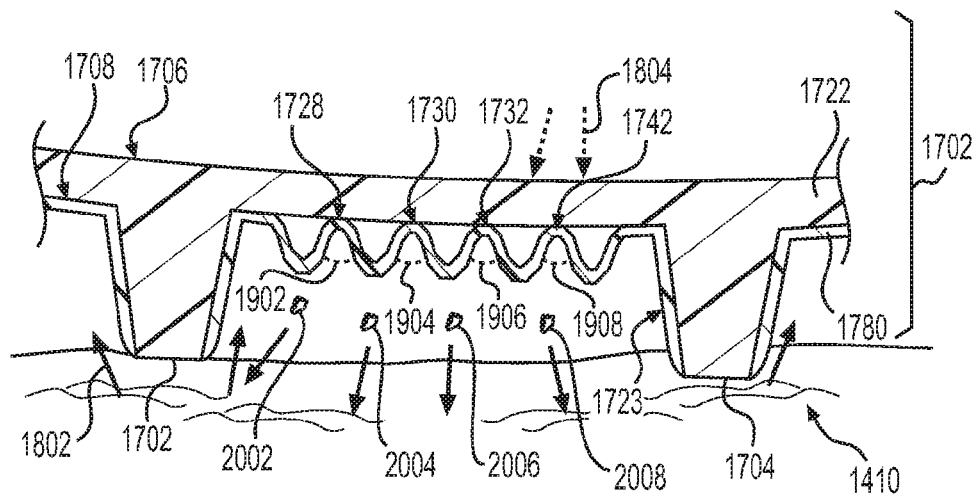
FIG. 21 is a schematic sectional view illustrating the sole structure in a substantial release state of the stride cycle.

FIG. 21 is a schematic sectional view illustrating the sole structure 1702 in an initial release state in an operation cycle of the structure. As shown in FIG. 21, in the initial release state the sole structure 1702 of the article of footwear may begin to lift off from the ground surface. As the sole structure 1702 begins lift off from the ground surface 1410, the layer of compacted ground surface material 1902 may begin to separate from the ground surface and become exposed, and a compression force 1802 may begin to release. As the layer of compacted ground surface material 1902 becomes exposed and the compression force 1802 is released, a portion of the reactive energy absorbed and stored in the first frusto-conical structure 1728, expressed as reactive force 1804, may begin to expand a portion of the spring portion of the first frusto-conical structure 1728 to a non-compressed state.

FIG. 22 is a schematic sectional view illustrating the sole structure 1702 in a full release state in an operation cycle of the structure. In the full release state, the sole structure 1702 continues to lift off from the ground surface 1410. In this state, reactive energy absorbed and stored in the first frusto-conical structure 1728 may continue to be expressed as a reactive force 1804 at the spring portion of the first frusto-conical structure 1728 to expand the spring portion of the first frusto-conical structure 1728 toward a fully non-compressed state. Continued expansion of the spring portion of the first frusto-conical structure 1412 may continue to break apart the layer of compacted ground surface material 1902 into particles of ground surface material 2002. In some embodiments, in response to release of the compression force 1802, the first frusto-conical structure 1728 may expand to a substantially expanded, non-compressed state. Reactive energy absorbed and stored in the first frusto-conical structure 1728 may be transferred to the particles of ground surface material 2002 to expel particles of ground surface material 2002 from the recess portion of the first frusto-conical structure 1728.

In the full release state, the spring portion of the first frusto-conical structure 1728 may be fully extended in a coned-disc shape, and the reactive energy absorbed and stored in the first frusto-conical structure 1728 from the compression force 1802 may be fully transferred from the first frusto-conical structure 1728 to the particles of ground surface material 2002. Ground surface material may be prevented from accumulating on the outer sole structure surface of the sole structure 1702 of the article of footwear in active use.

As discussed above, an exemplary embodiment of an outer sole assembly may operate to prevent onset of accumulation of ground surface material on an outer sole structure surface of a sole structure of an article of footwear in active use of the article of footwear. As illustrated in FIGS. 1-22, in some embodiments an outer sole assembly may operate in association with a heel strike to toe off stride cycle in active use of the article of footwear. In some embodiments, an outer sole assembly may operate in association with other active use of an article of footwear. Non-exhaustive examples include playing sports such as soccer, football, lacrosse, etc., as well as activities in snow, ice, and slush. Alternative active use of an article of footwear that may be suitable for a ground surface material accumulation prevention structure may be selected for the intended use.

Functional, operational, and performance characteristics of an outer sole assembly may be controlled by selecting materials and dimensional characteristics of the frusto-conical structure of the outer sole assembly. A reactive force characteristic of the frusto-conical structure may be determined by controlling various factors, including a material composition of the frusto-conical structure, a desired rigidity of the frusto-conical structure, a strength of the cured/hardened molding material(s), a thickness of the frusto-conical structure, a depth of the frusto-conical structure, a size of the frusto-conical structure (e.g., radius or length and width), and an amount of molding material desired for making the frusto-conical structure (cost factors). Other factors in light of the present disclosure and a desired application and performance characteristics may be selected for the intended use.

FIGS. 1-22 may have one or more advantages in a particular application. In some applications, one embodiment may have a more desired performance characteristic, such as providing a desired reactive force characteristic, providing a desired traction characteristic for a selected playing surface, or providing a desired safety characteristic. In some embodiments, one embodiment may have a more desired aesthetic characteristic than another embodiment. An appropriate configuration for a desired application may be selected for the intended use.

While various embodiments have been described, the description is intended to be exemplary, rather than limiting and it will be apparent to those of ordinary skill in the art that many more embodiments and implementations are possible that are within the scope of the invention. Any feature of any embodiment may be used in combination with or substituted for any other feature or element in any other embodiment unless specifically restricted. Accordingly, the invention is not to be restricted except in light of the attached claims and their equivalents. Also, various modifications and changes may be made within the scope of the attached claims.

What is claimed is:

1. A sole structure for an article of footwear, the sole structure comprising:
    a sole plate including a stud extending from a first surface of the sole plate; and
    an outer sole structure including a ground-contacting surface and a second surface disposed on an opposite side of the outer sole structure than the ground-contacting surface and opposing the first surface, the outer sole structure including a plurality of first projections extending from the second surface in a first direction toward the first surface and a plurality of second projections extending from the second surface in an opposite second direction away from the first surface, each first projection of the plurality of first projections forming a corresponding first recess in the ground-contacting surface and having a distal end that is in contact with the first surface.

2. The sole structure of claim 1, wherein the outer sole structure includes an opening receiving the stud therein.

3. The sole structure of claim 1, wherein the outer sole structure includes a plurality of third projections that extend from the second surface and have distal ends in contact with an outer surface of the stud adjacent to the second surface.

4. The sole structure of claim 3, wherein the plurality of first projections and the plurality of third projections include a frusto-conical shape.

5. The sole structure of claim 3, wherein each second projection of the plurality of second projections forms a corresponding second recess in the second surface that opposes the first surface and each third projection of the plurality of third projections forms a corresponding third recess in the ground-contacting surface.

6. The sole structure of claim 1, wherein projections of the plurality of first projections include a frusto-conical shape.

7. The sole structure of claim 1, wherein the plurality of second projections form a portion of the ground-contacting surface, the plurality of second projections alternating with the plurality of first projections.

8. A sole structure for an article of footwear, the sole structure comprising:
    a sole plate including a stud extending from a first surface of the sole plate; and
    an outer sole structure including a ground-contacting surface and a second surface disposed on an opposite side of the outer sole structure than the ground-contacting surface, the outer sole structure including a plurality of first projections each extending from the second surface in a direction toward the first surface and forming a corresponding first recess in the ground-contacting surface, and a plurality of second projections alternating with the plurality of first projections, extending from the second surface in an opposite direction than the plurality of first projections, and forming a portion of the ground-contacting surface, each second projection of the plurality of second projections forming a corresponding second recess in the second surface that opposes the first surface of the sole plate.

9. The sole structure of claim 8, wherein the outer sole structure includes an opening receiving the stud therein.

10. The sole structure of claim 8, wherein the outer sole structure includes a plurality of third projections that extend from the second surface in a direction toward an outer surface of the stud adjacent to the second surface.

11. The sole structure of claim 10, wherein the plurality of first projections, the plurality of second projections, and the plurality of third projections include a frusto-conical shape.

12. The sole structure of claim 10, wherein the ground-contacting surface includes third recesses disposed at locations corresponding with projections of the plurality of third projections.

13. The sole structure of claim 8, wherein the projections of the plurality of first projections include a frusto-conical shape.

14. The sole structure of claim 8, wherein the plurality of first projections include distal ends that are in contact with the first surface.

* * * * *